US010764840B2

(12) United States Patent
Yoo et al.

(10) Patent No.: US 10,764,840 B2
(45) Date of Patent: Sep. 1, 2020

(54) SOUNDING REFERENCE SIGNAL (SRS) COORDINATION, POWER CONTROL, AND SYNCHRONIZATION FOR DISTRIBUTED COORDINATED MULTIPOINT (COMP)

(71) Applicant: QUALCOMM Incorporated, San Diego, CA (US)

(72) Inventors: Taesang Yoo, San Diego, CA (US); Jing Sun, San Diego, CA (US); Siddhartha Mallik, San Diego, CA (US); Xiaoxia Zhang, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 15/964,851

(22) Filed: Apr. 27, 2018

(65) Prior Publication Data

US 2018/0324713 A1 Nov. 8, 2018

Related U.S. Application Data

(60) Provisional application No. 62/502,574, filed on May 5, 2017.

(51) Int. Cl.
*H04W 52/32* (2009.01)
*H04W 72/04* (2009.01)
*H04W 52/40* (2009.01)

(52) U.S. Cl.
CPC ......... *H04W 52/325* (2013.01); *H04W 52/40* (2013.01); *H04W 72/0473* (2013.01)

(58) Field of Classification Search
None
See application file for complete search history.

(56) References Cited

U.S. PATENT DOCUMENTS

| 2010/0041408 | A1* | 2/2010 | Caire | H04L 5/0007 |
| | | | | 455/446 |
| 2014/0211734 | A1* | 7/2014 | Seo | H04J 11/0056 |
| | | | | 370/329 |
| 2014/0233484 | A1* | 8/2014 | Doetsch | H04J 11/0053 |
| | | | | 370/329 |
| 2015/0341910 | A1* | 11/2015 | Hayashi | H04W 72/042 |
| | | | | 455/452.1 |

(Continued)

*Primary Examiner* — Fayyaz Alam
(74) *Attorney, Agent, or Firm* — Patterson + Sheridan, L.L.P.

(57) ABSTRACT

Certain aspects of the present disclosure relate to methods and apparatus for sounding reference signal (SRS) coordination, power control, and synchronization for distributed coordinated multipoint (CoMP) using communications systems operating according to new radio (NR) technologies. For example, a method for wireless communications by a network entity includes determining a first amount of transmission (Tx) power for transmission of signals originating from a first cluster center that is connected to the network entity, determining a second amount of Tx power for transmission of signals originating from at least a second cluster center that is connected to the network entity, and transmitting signals for one or more user equipment (UEs) served by the first cluster center and one or more UEs served by the second cluster center based on the first amount of Tx power and the second amount of Tx power.

24 Claims, 30 Drawing Sheets

(56) References Cited

U.S. PATENT DOCUMENTS

2017/0289984 A1* 10/2017 Baligh .............. H04W 72/0473
2018/0069685 A1*  3/2018 Yang ......................... H04L 5/14
2018/0278450 A1*  9/2018 Zarifi ................. H04W 52/325

* cited by examiner

SOUNDING REFERENCE SIGNAL (SRS) COORDINATION, POWER CONTROL, AND SYNCHRONIZATION FOR DISTRIBUTED COORDINATED MULTIPOINT (COMP)

CLAIM OF PRIORITY UNDER 35 U.S.C. § 119

The present Application for Patent claims benefit of U.S. Provisional Patent Application Ser. No. 62/502,574, filed May 5, 2017, assigned to the assignee hereof and hereby expressly incorporated by reference herein.

BACKGROUND

Field of the Disclosure

The present disclosure relates generally to communication systems, and more particularly, to methods and apparatus for sounding reference signal (SRS) coordination, power control, and synchronization for distributed coordinated multipoint (CoMP) using communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a network entity. The method generally includes determining a first amount of transmission (Tx) power for transmission of signals originating from a first cluster center that is connected to the network entity, determining a second amount of Tx power for transmission of signals originating from at least a second cluster center that is connected to the network entity, and transmitting signals for one or more user equipment (UEs) served by the first cluster center and one or more UEs served by the second cluster center based on the first amount of Tx power and the second amount of Tx power.

Certain aspects provide a method for wireless communication by a network entity. The method generally includes estimating a first parameter of network entities connected to a first cluster center that includes the network entity, estimating a second parameter of network entities connected to a second cluster center that includes the network entity, and applying the first parameter and the second parameter for transmission of each of the data originating from the first cluster center and the second cluster center, respectively, for transmission to one or more UEs served by the first cluster center and the second cluster center.

Certain aspects provide an apparatus for wireless communication by a network entity. The apparatus generally includes at least one processor configured to determine a first amount of transmission (Tx) power for transmission of signals originating from a first cluster center that is connected to the network entity, determine a second amount of Tx power for transmission of signals originating from at least a second cluster center that is connected to the network entity, and a transmitter configured to transmit signals for one or more user equipment (UEs) served by the first cluster center and one or more UEs served by the second cluster center based on the first amount of Tx power and the second amount of Tx power.

Certain aspects provide an apparatus for wireless communication by a network entity. The apparatus generally includes at least one processor configured to estimate a first parameter of network entities connected to a first cluster center that includes the network entity, estimate a second parameter of network entities connected to a second cluster center that includes the network entity, and apply the first parameter and the second parameter for transmission of each of the data originating from the first cluster center and the second cluster center, respectively, for transmission to one or more UEs served by the first cluster center and the second cluster center, and a memory coupled to the at least one processor.

Certain aspects provide an apparatus for wireless communications by a user equipment (UE). The apparatus generally includes means for determining a first amount of transmission (Tx) power for transmission of signals originating from a first cluster center that is connected to the network entity, means for determining a second amount of Tx power for transmission of signals originating from at least a second cluster center that is connected to the network entity, and means for transmitting signals for one or more user equipment (UEs) served by the first cluster center and one or more UEs served by the second cluster center based on the first amount of Tx power and the second amount of Tx power.

Certain aspects provide an apparatus for wireless communication by a network entity. The apparatus generally includes means for estimating a first parameter of network entities connected to a first cluster center that includes the network entity, means for estimating a second parameter of network entities connected to a second cluster center that includes the network entity, and means for applying the first parameter and the second parameter for transmission of each of the data originating from the first cluster center and the second cluster center, respectively, for transmission to one or more UEs served by the first cluster center and the second cluster center.

Certain aspects provide a non-transitory computer readable medium for wireless communication by a network entity having instructions stored thereon. The instructions generally include determining a first amount of transmission (Tx) power for transmission of signals originating from a first cluster center that is connected to the network entity, determining a second amount of Tx power for transmission of signals originating from at least a second cluster center that is connected to the network entity, and transmitting signals for one or more user equipment (UEs) served by the first cluster center and one or more UEs served by the second cluster center based on the first amount of Tx power and the second amount of Tx power.

Certain aspects provide a non-transitory computer readable medium for wireless communication by a network entity having instructions stored thereon. The instructions generally include estimating a first parameter of network entities connected to a first cluster center that includes the network entity, estimating a second parameter of network entities connected to a second cluster center that includes the network entity, and applying the first parameter and the second parameter for transmission of each of the data originating from the first cluster center and the second cluster center, respectively, for transmission to one or more UEs served by the first cluster center and the second cluster center.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
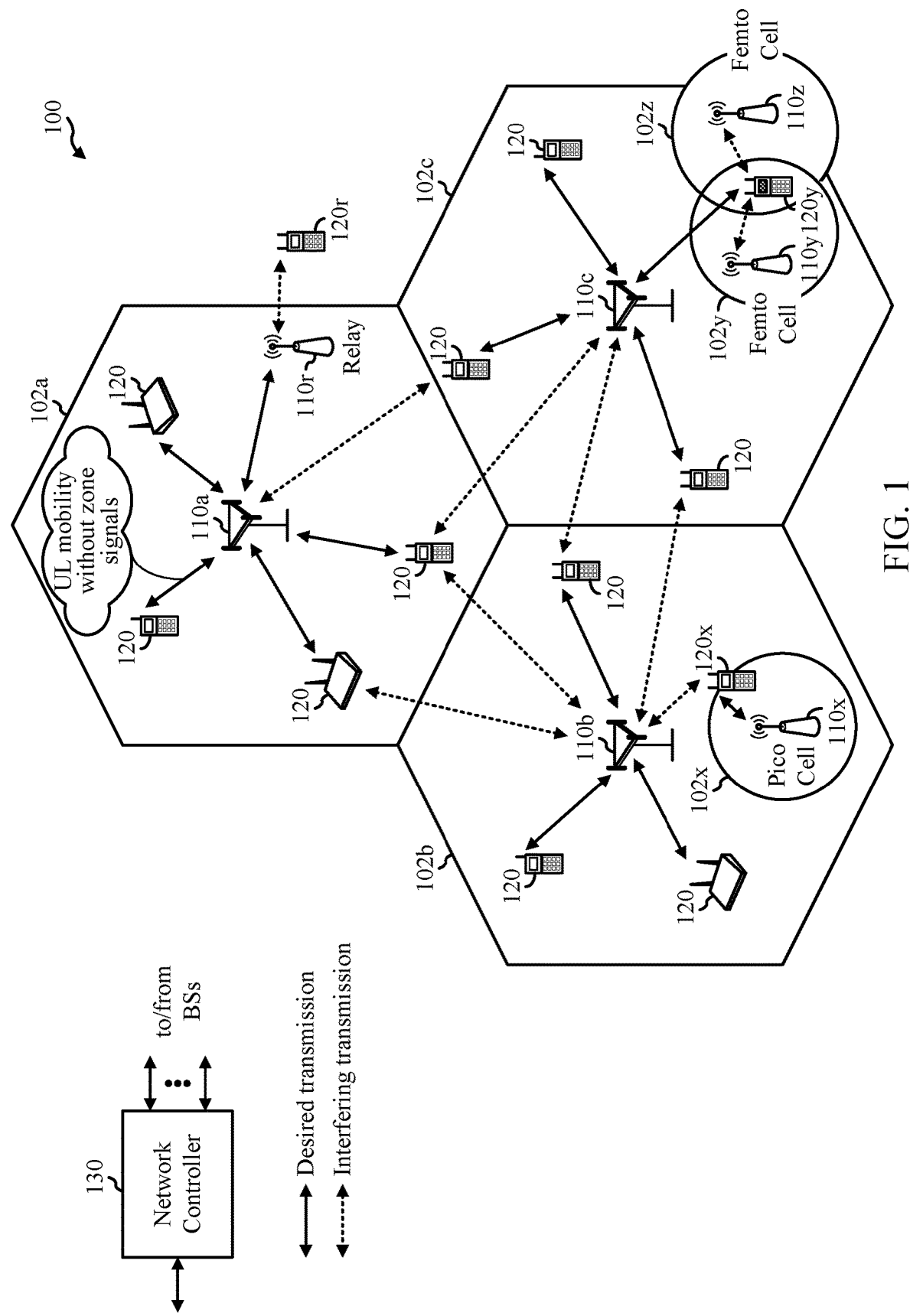
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information using, for example a receiver, from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
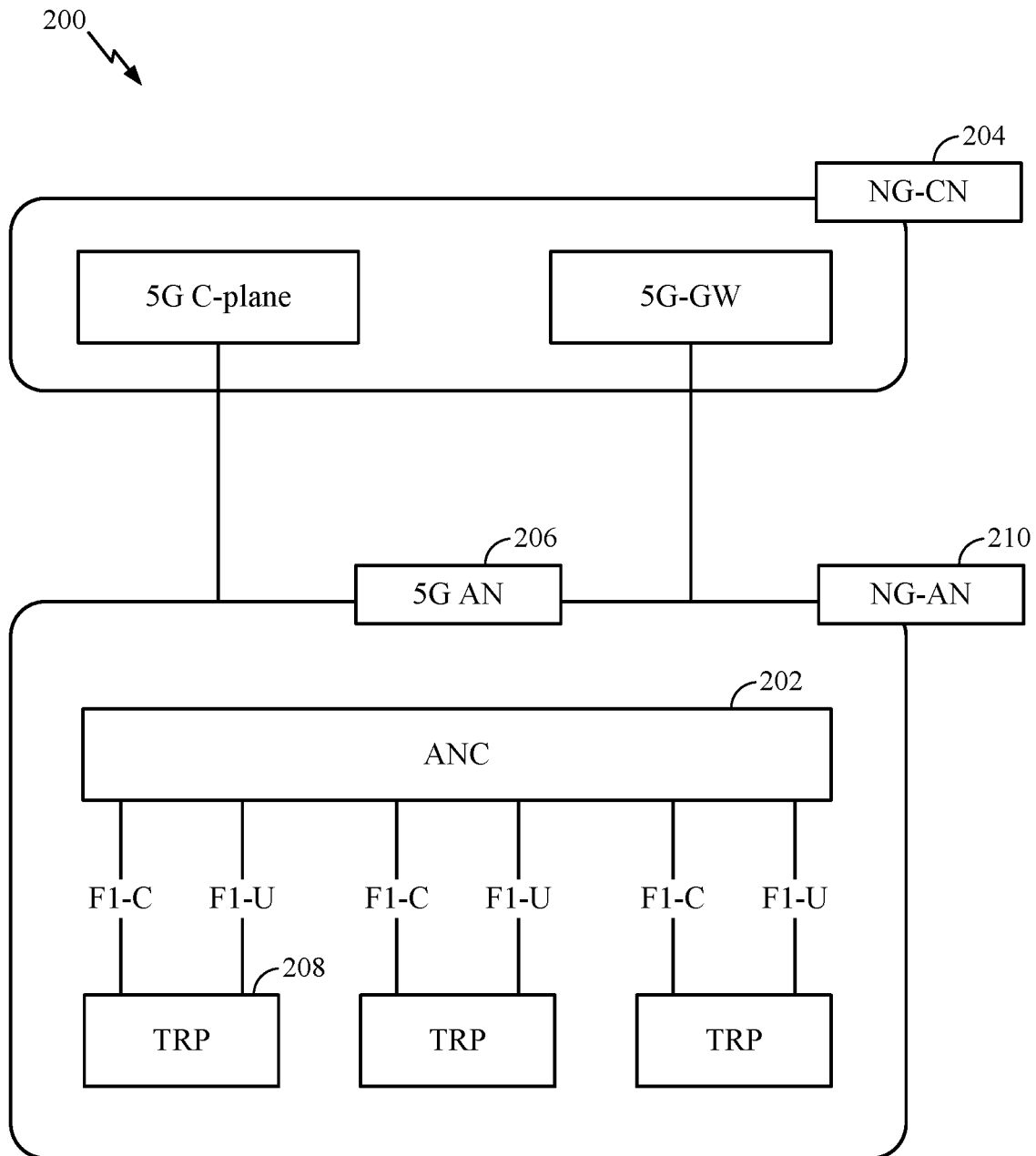
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
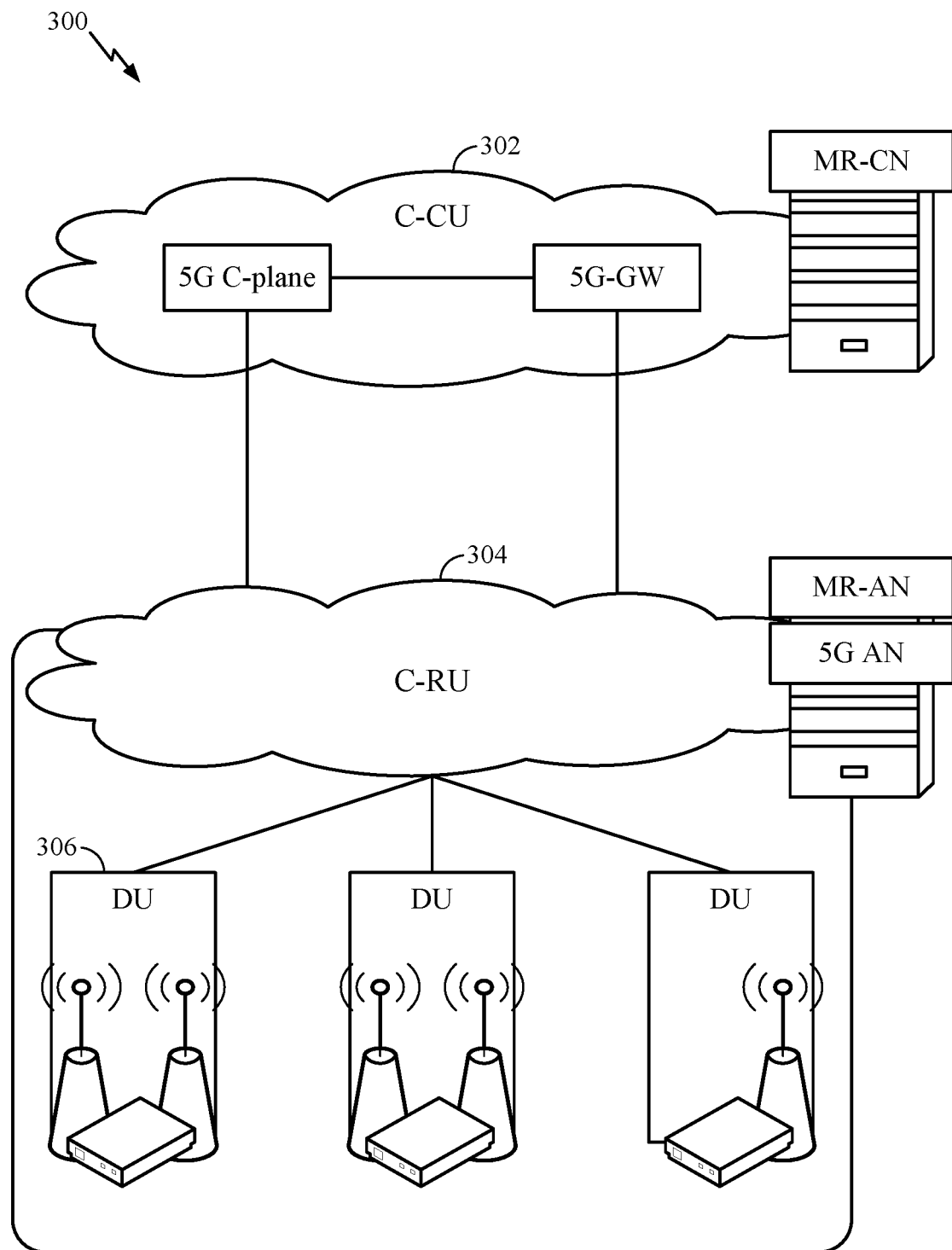
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
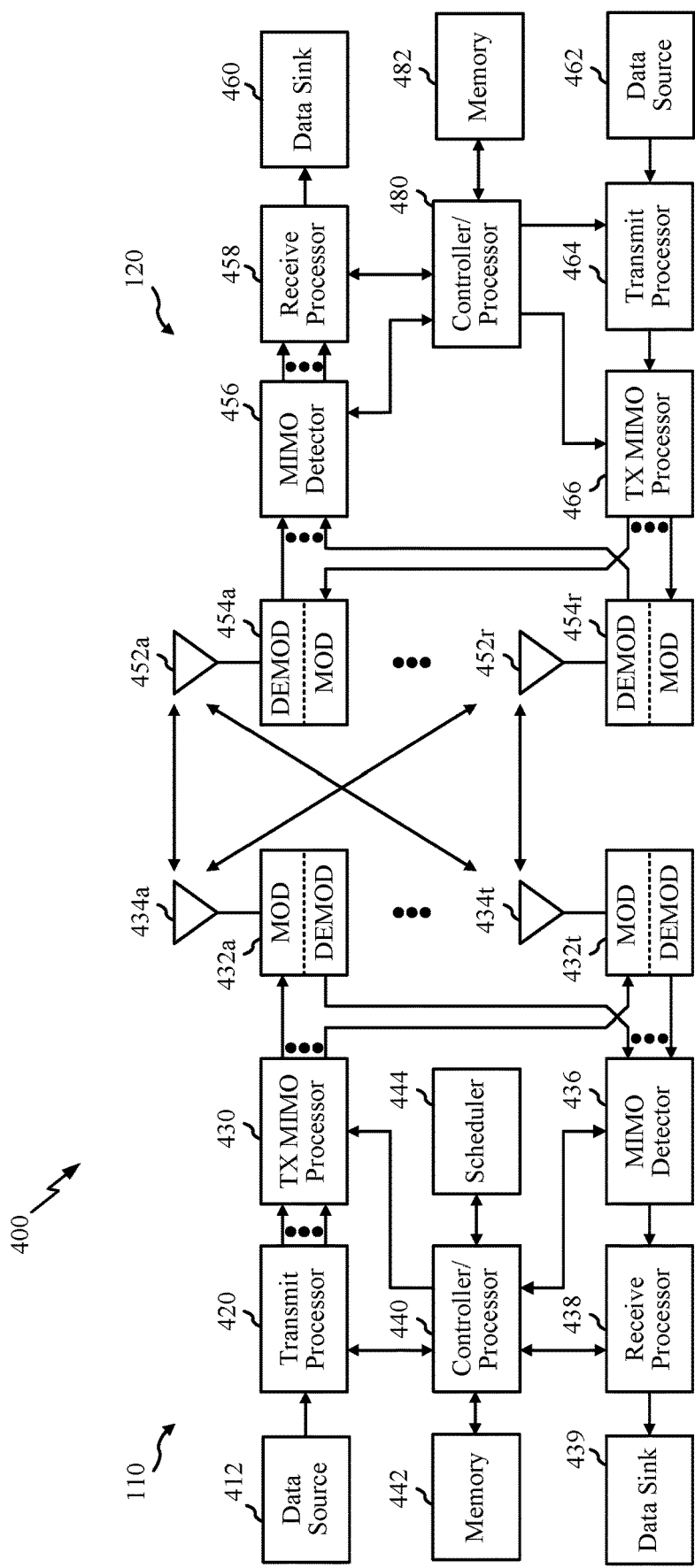
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, MOD/DEMOD 454, processors 466, 458, 464, and/or controller/processor 480 of the UE 120 and/or antennas 434, MOD/DEMOD 432, processors 430, 420, 438, and/or controller/processor 440 of the BS 110 may be used to perform the operations described herein and illustrated with reference to FIGS. 14-16.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (Tx) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the Tx MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, receivers that each include the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
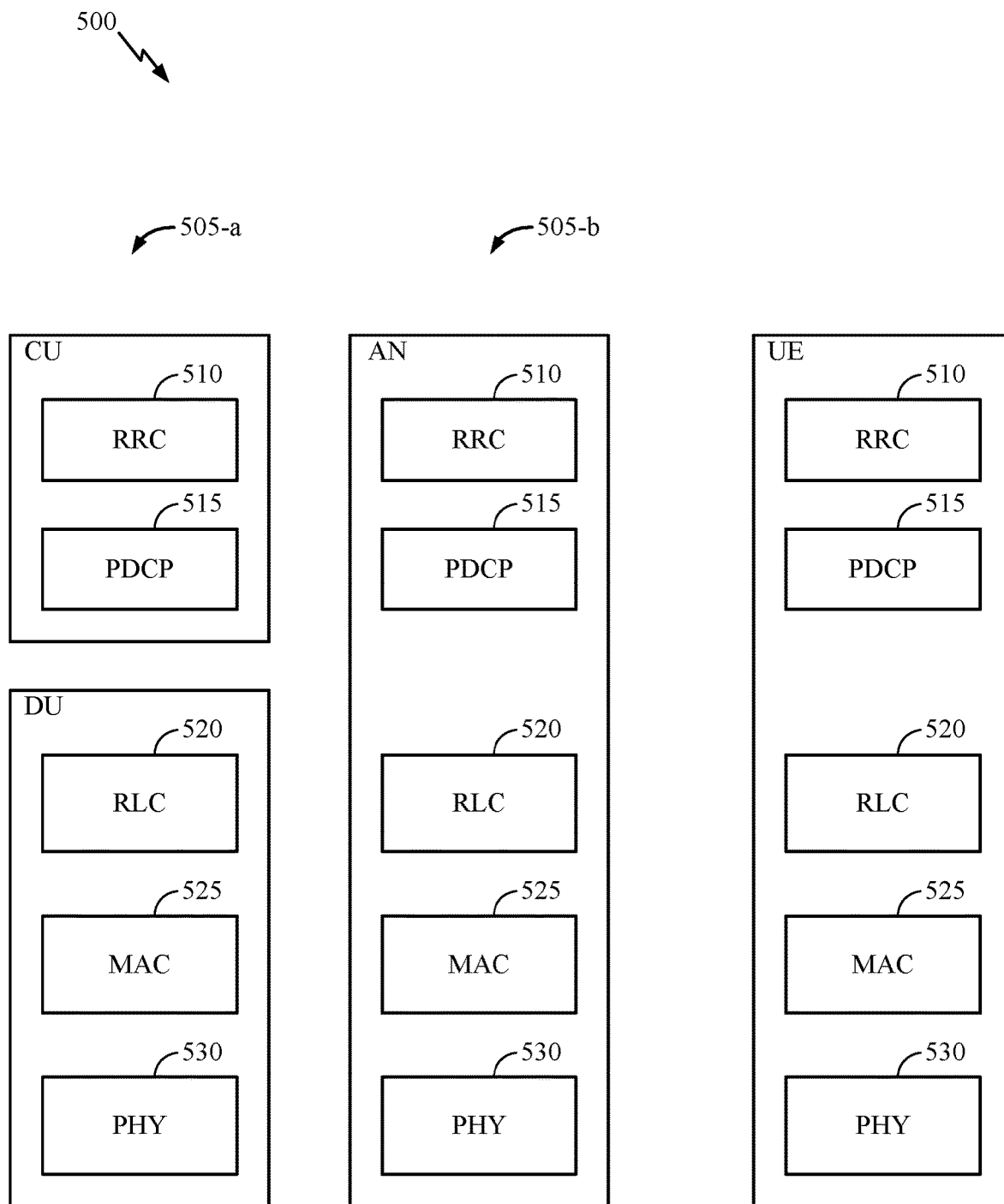
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
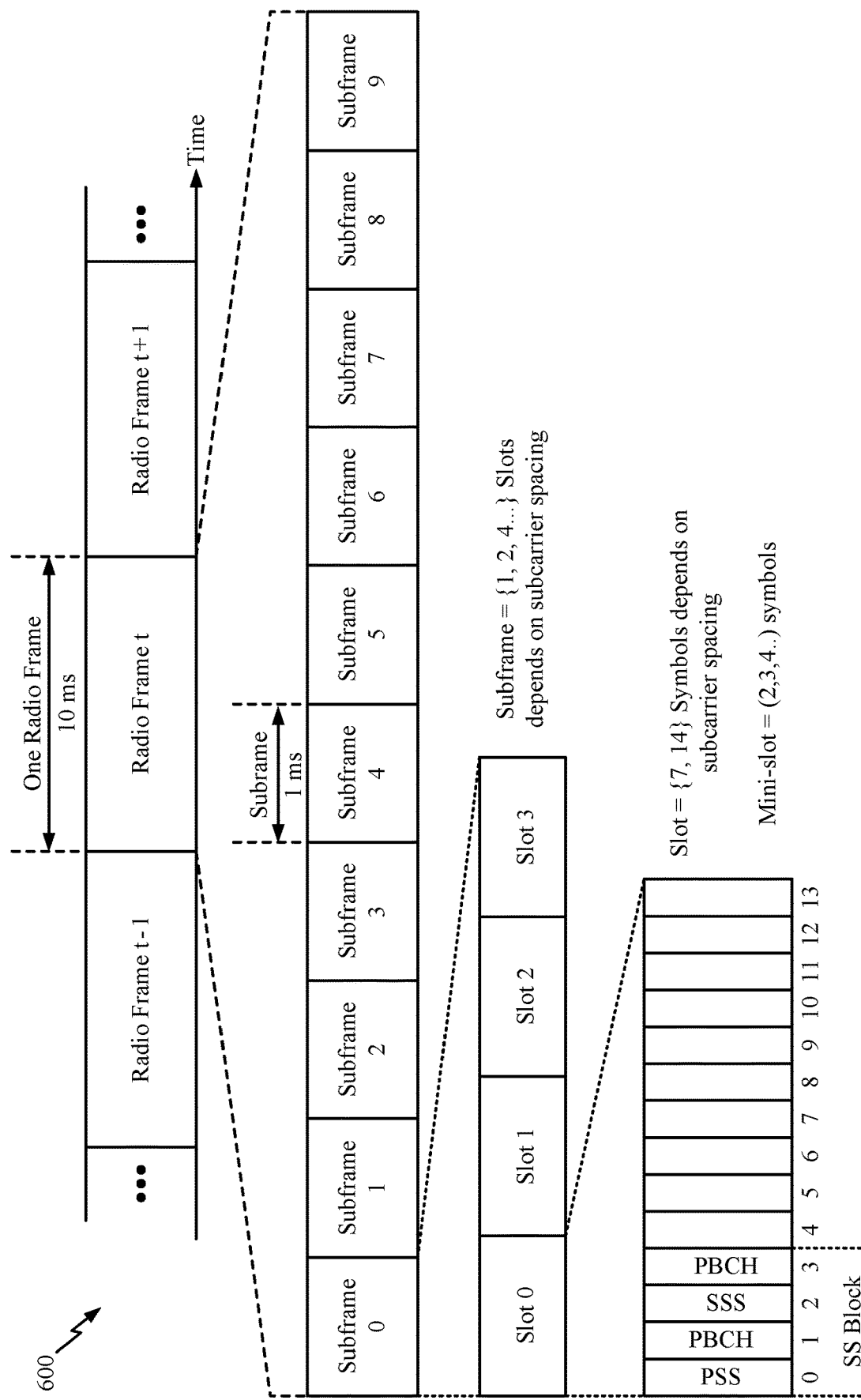
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of Coordinated Multipoint

Coordinated multipoint (CoMP) is a general framework for downlink (DL) and uplink (UL) cooperative transmission involving multiple non-collocated gNBs. CoMP can include a variety of cooperation techniques ranging from semi-static scheduler coordination to transmit beamforming and interference nulling across multiple network nodes.

Joint transmission (JT) is a particular CoMP strategy where multiple geographically separated gNBs coordinate to support transmission to, and receptions from, multiple UEs on the same time/frequency resources. The multiple geographically separated BSs coordinate to create beams, wherein each beam may be transmitted from each of the multiple geographically separated BSs to serve a UE. In practice, CoMP-JT may use centralized processing at a cluster center and fiber connections to multiple coordinating gNBs. In effect, this is like a large MIMO system with geographically distributed gNBs and UEs.

A cluster center may refer to a central unit (CU), access node controller (ANC), and other hardware/software (HW/SW) equipment with high processing capability housed in a centralized location, connected and in communication with one or multiple network entities such as, for example, BSs. A cluster center and the set of BSs connected to the cluster center may be referred to collectively as a "cluster". In some cases, a cluster may consist of multiple BSs without a separate entity acting as a cluster center, and rather, one of the BSs in the cluster may have high processing capability and function as the cluster center. A network entity may be a base station that may be a distributed unit (DU), radio head, or TRP that is in communication with one or a number of cluster centers. A BS may be connected to a single cluster center. In some cases, a BS may be connected to multiple cluster centers, in which case the BS belongs to multiple clusters.

For example, a cluster of N cooperating gNBs can be provided that serve a set of M UEs simultaneously. A channel matrix can be provided that contains entries that represent the channel from a gNB in the cluster to a UE of the set and many, if not all, combinations thereof. For example the matrix can be represented as follows:

$$\begin{bmatrix} H_{1,1} & H_{1,2} & \ldots & H_{1,c} & \ldots \\ H_{2,1} & H_{2,2} & \ldots & H_{2,c} & \ldots \\ \vdots & \vdots & \vdots & \vdots & \vdots \\ \vdots & \vdots & \ddots & \ddots & \ldots \\ H_{u,1} & H_{u,2} & \ldots & H_{u,c} & \ldots \\ \vdots & \vdots & \vdots & \vdots & \vdots \end{bmatrix}$$

Further, as an example, the beams to, and/or from, the set of UEs may be determined to maximize the signal to leakage ratio (SLR) using an algorithm such as, for example, the following:

$$W_{:,u} = \arg \max_{\|w\|^2 = P_s} \frac{|H_{u,:}w|^2}{1 + \sum_{u' \neq u} |H_{u',:}w|^2}$$

This algorithm can use accurate channel knowledge to provide accurate beam pointing. More precisely, the accurate channel knowledge provides for beam nulling toward unintended UEs using the above algorithm for example.

Figure 7:
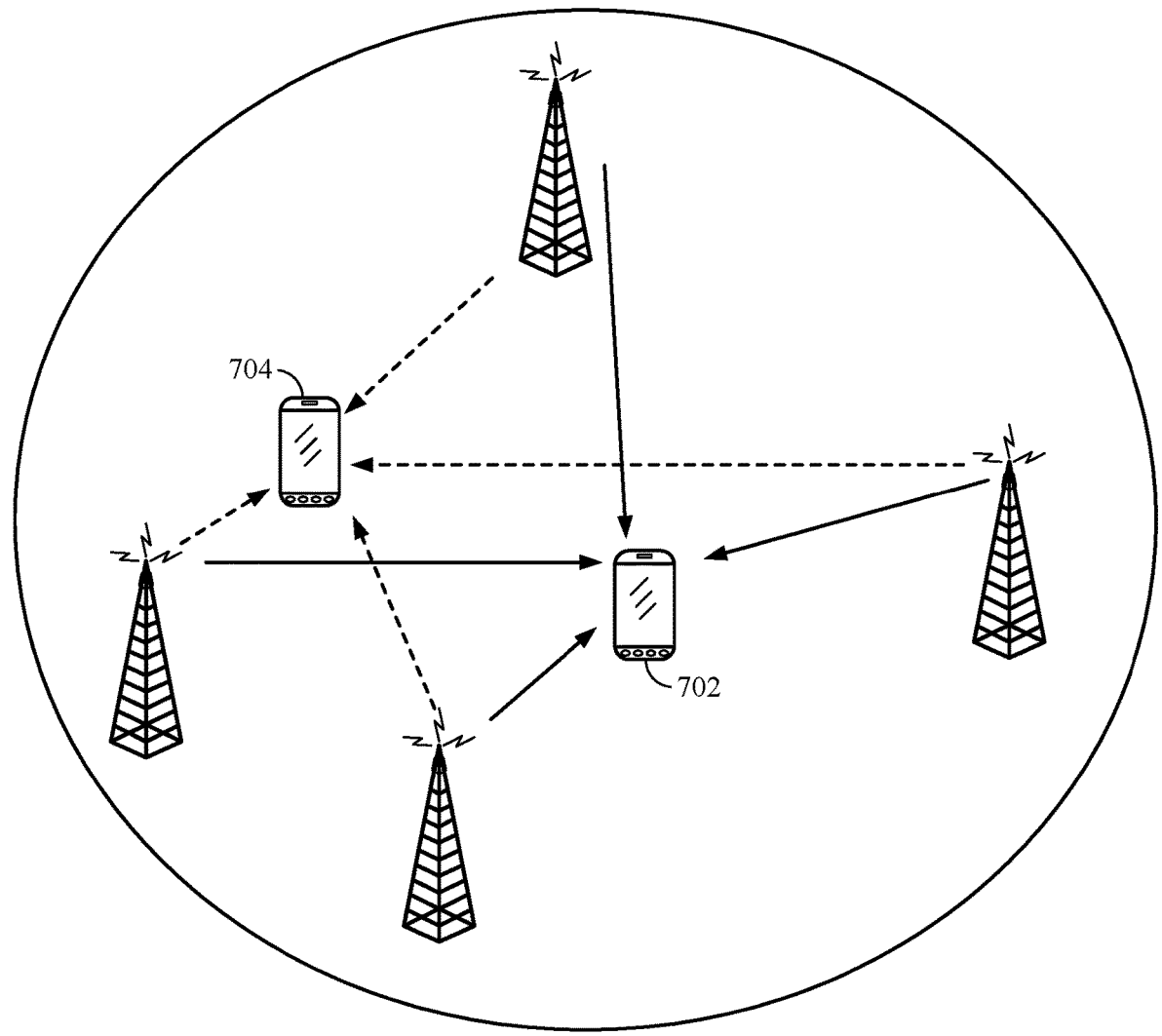
FIG. 7 illustrates an example coordinated multipoint (CoMP) scenario, in which aspects of the present disclosure may be practiced.

For example, as shown in FIG. 7, for DL CoMP, only an intended UE 702 sees the signal, because the net signal toward unintended UEs 704 is very small as the signals from multiple eNBs are constructed such that they cancel out at unintended UEs 704.

Channel reciprocity is a concept that is used to implement one or more aspects of the disclosure. For example, in time-division duplexing (TDD) systems, the uplink and downlink transmissions take place over the same frequency band. Hence, if the transmissions are performed within the channel coherence time, the uplink and downlink channel states may be considered identical. As a result, the downlink channel to each user ideally can be estimated in the uplink direction through the transmission of sounding reference signals (SRS) from the user equipment (UEs), and can be used in the design of downlink beams. The SRS may be used to measure the uplink channel quality over a portion of the uplink channel bandwidth. The eNodeB (or gNB) instructs the UE to transmit the SRS across a specific portion of the uplink channel bandwidth.

This channel reciprocity concept can be combined with CoMP-JT to provide reciprocity-based CoMP-JT. Reciprocity-based CoMP-JT may include high density SRS feedback. The SRS feedback may be used to derive CoMP beamforming coefficients, for example to maximize the signal-to-leakage ratio (for DL CoMP-JT). Additionally, the SRS feedback can also be used to derive MMSE equalization coefficients (for UL CoMP-JT).

Figure 8A:
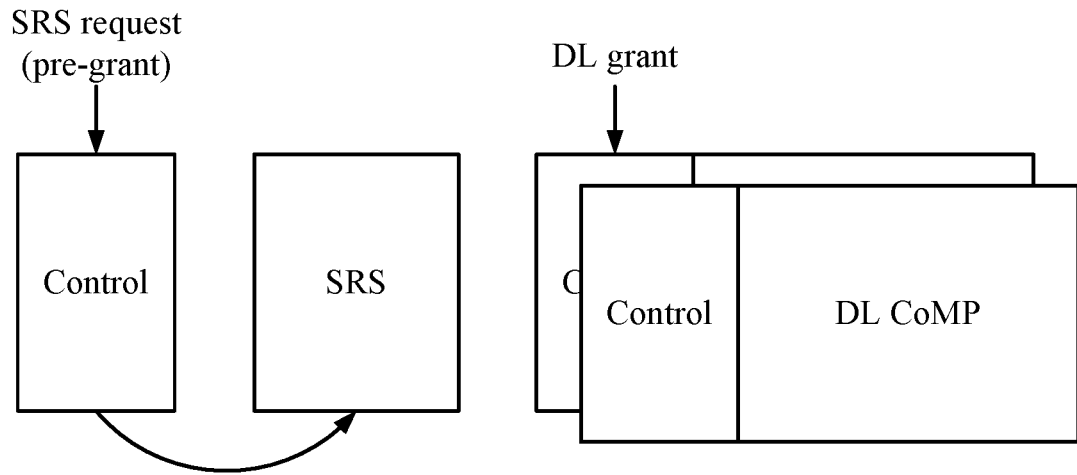
FIGS. 8A and 8B illustrate example signals that may be transmitted with transmit power control, in accordance with aspects of the present disclosure.
Figure 8B:
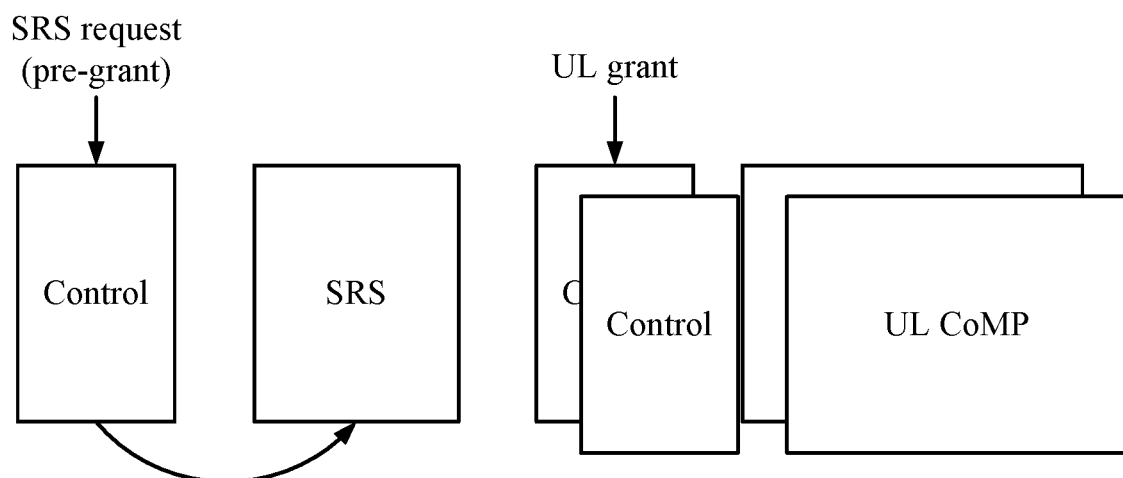

In some cases, as shown in FIGS. 8A and 8B, a gNB selects a set of UEs and requests SRS feedback, which may be referred to as a "pre-grant." The UE responds with the SRS feedback. Based on the SRS feedback, the eNB makes CoMP scheduling decisions. For example, some CoMP scheduling decisions that can be made can include one or more of selecting UE pairing, rank, beam direction, and/or a Modulation/Coding Scheme (MCS).

Looking now at FIG. 8A specifically, for DL CoMP-JT, demodulation reference signal (DMRS) and physical downlink shared channel (PDSCH) are beamformed via CoMP. In CoMP-JT, DMRS/PDSCH of the paired UEs are overlaid on the same time/frequency resources.

Further, looking now at FIG. 8B, for UL CoMP-JT, DMRS and physical uplink shared channel (PUSCH) are spatially separated via CoMP. In CoMP-JT, DMRS/PUSCH of the paired UEs are overlaid on the same time/frequency resources. One or more cases as described herein may focus on reciprocity-based CoMP-JT for the sake of explanation. However, the cases are not limited thereto as the cases may also apply both reciprocity-based (i.e. SRS-based) and non-reciprocity-based (i.e. CSI feedback based) CoMP-JT.

Figure 9:
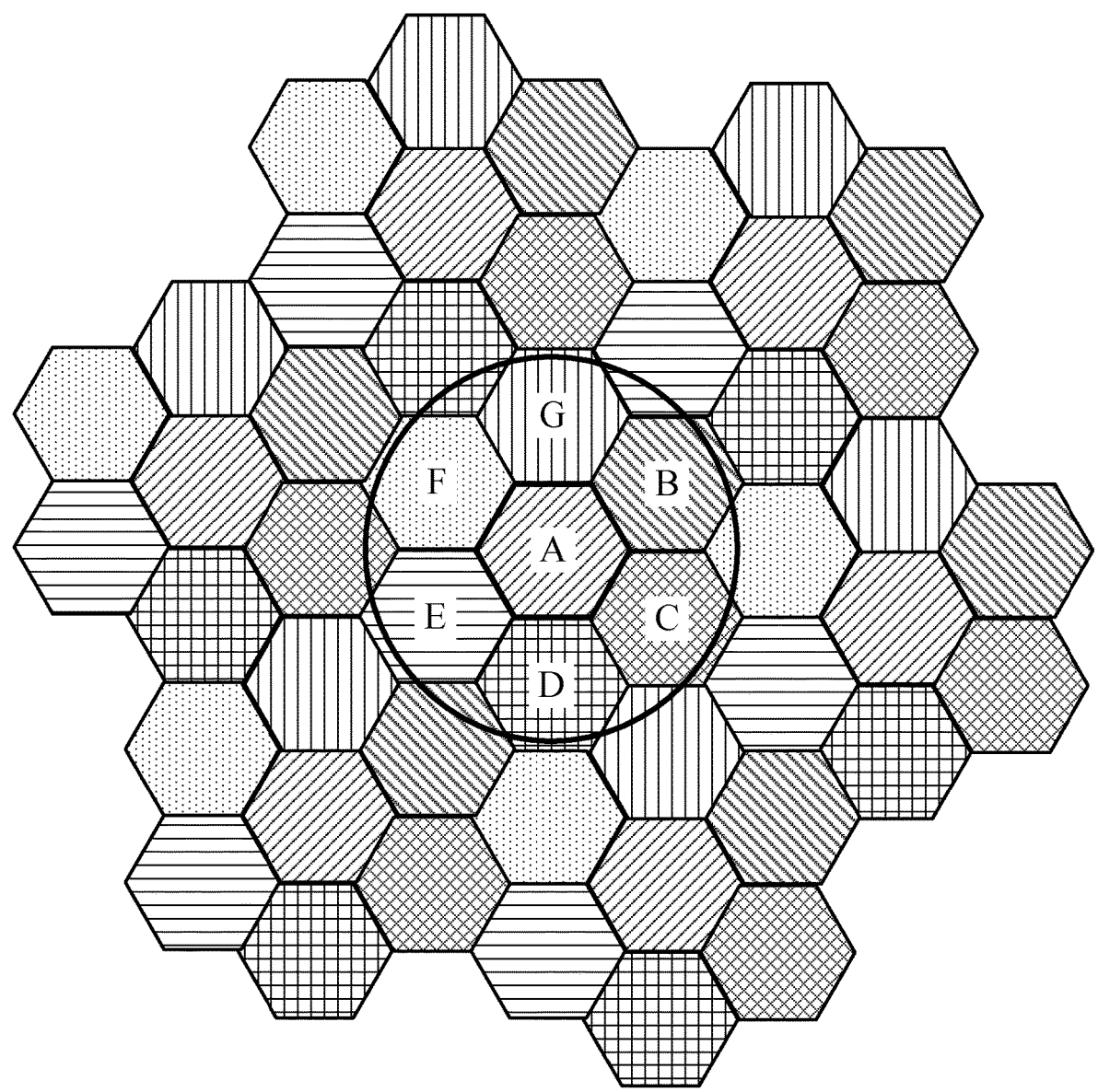
FIG. 9 illustrates an example of a centralized CoMP scenario, in accordance with aspects of the present disclosure.

FIG. 9 illustrates an example of a centralized CoMP scenario, in accordance with aspects of the present disclosure. In a centralized CoMP scheduling may be provided by one cluster center, for example co-located with cell A. Specifically, scheduling may be provided by having each cell, including any one or more of cells B-G, send channel state information (CSI), such as for example an SRS measurement, to the cluster center A. The central scheduler housed in the cluster center may then determine one or more beam weights. The cluster center A may then send the beam weights and data (e.g. modulated I/Q samples) to each cell. It may be appreciated that such a centralized CoMP may be infeasible for a large size deployment, due to a very high computational amount needed to be performed at the cluster center.

Figure 10:
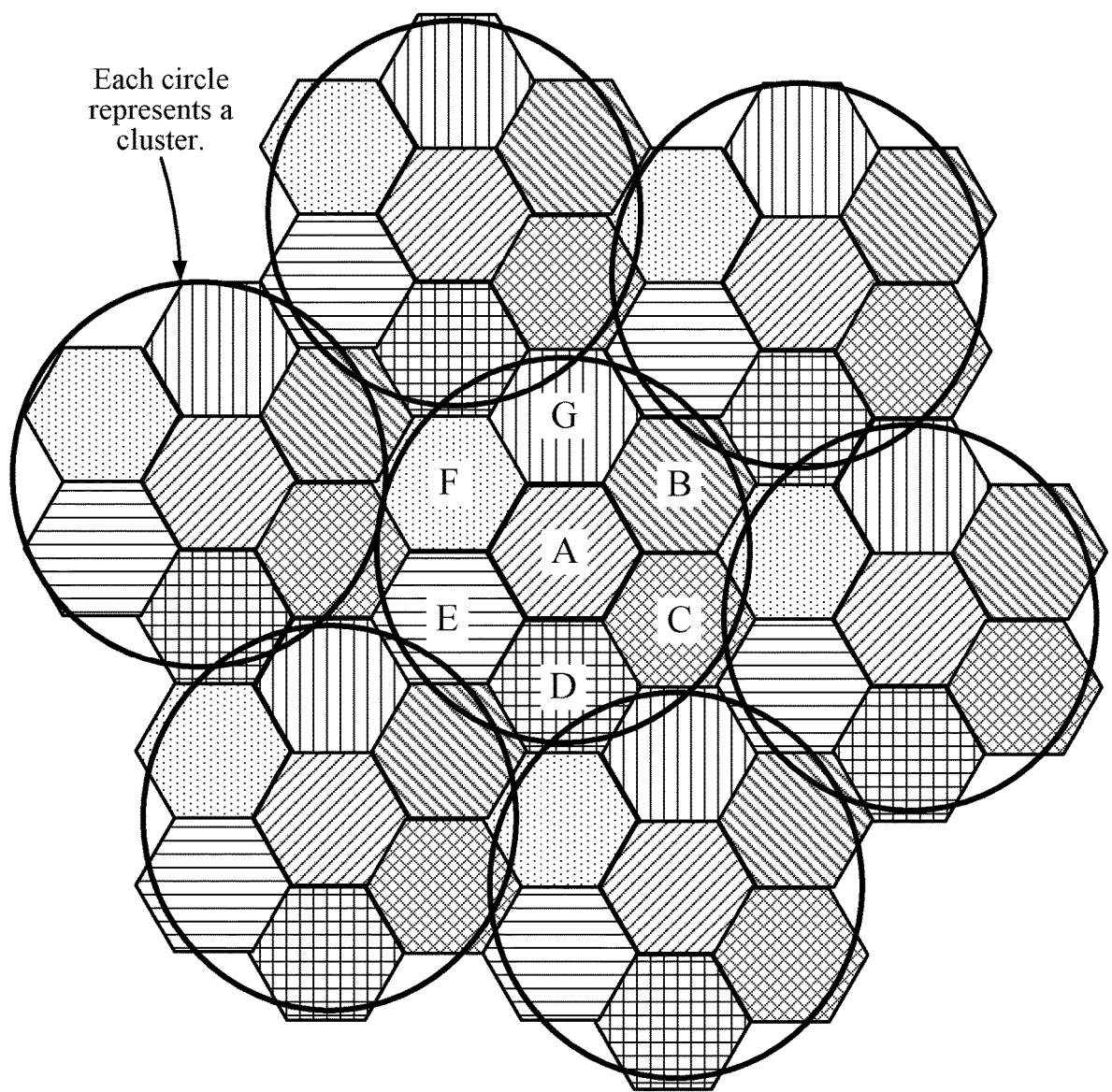
FIG. 10 illustrates an example of a distributed CoMP scenario, in accordance with aspects of the present disclosure.

FIG. 10 illustrates an example of a distributed CoMP scenario, in accordance with aspects of the present disclosure. In a distributed CoMP scheduling may be provided by multiple cluster centers. For example, cell A acts as a cluster center for a cluster that includes cells A-G as indicated by the circle drawn around the cells. Further, as indicated by the other circles, multiple clusters may be provided in a distributed CoMP, each with their own cluster center that may provide scheduling to that cluster of cells. For example, each cell may send CSI (e.g. SRS measurement) to the cluster center in their respective cluster. The central scheduler in the cluster center may then determine one or more beam weights. The cluster center may then send the beam weights and data (e.g. modulated I/Q samples) to each cell in the cluster.

Accordingly, coordination and data exchange may be limited to within each cluster, and therefore, such a distributed CoMP may be feasible for large deployment. However, a potential complexity versus performance tradeoff is provided in that interference from outside the cluster may not be taken care of by CoMP-JT. Therefore, CoMP performance along the edge of the cluster may not be good due to interference from the other surrounding clusters.

Figure 11:
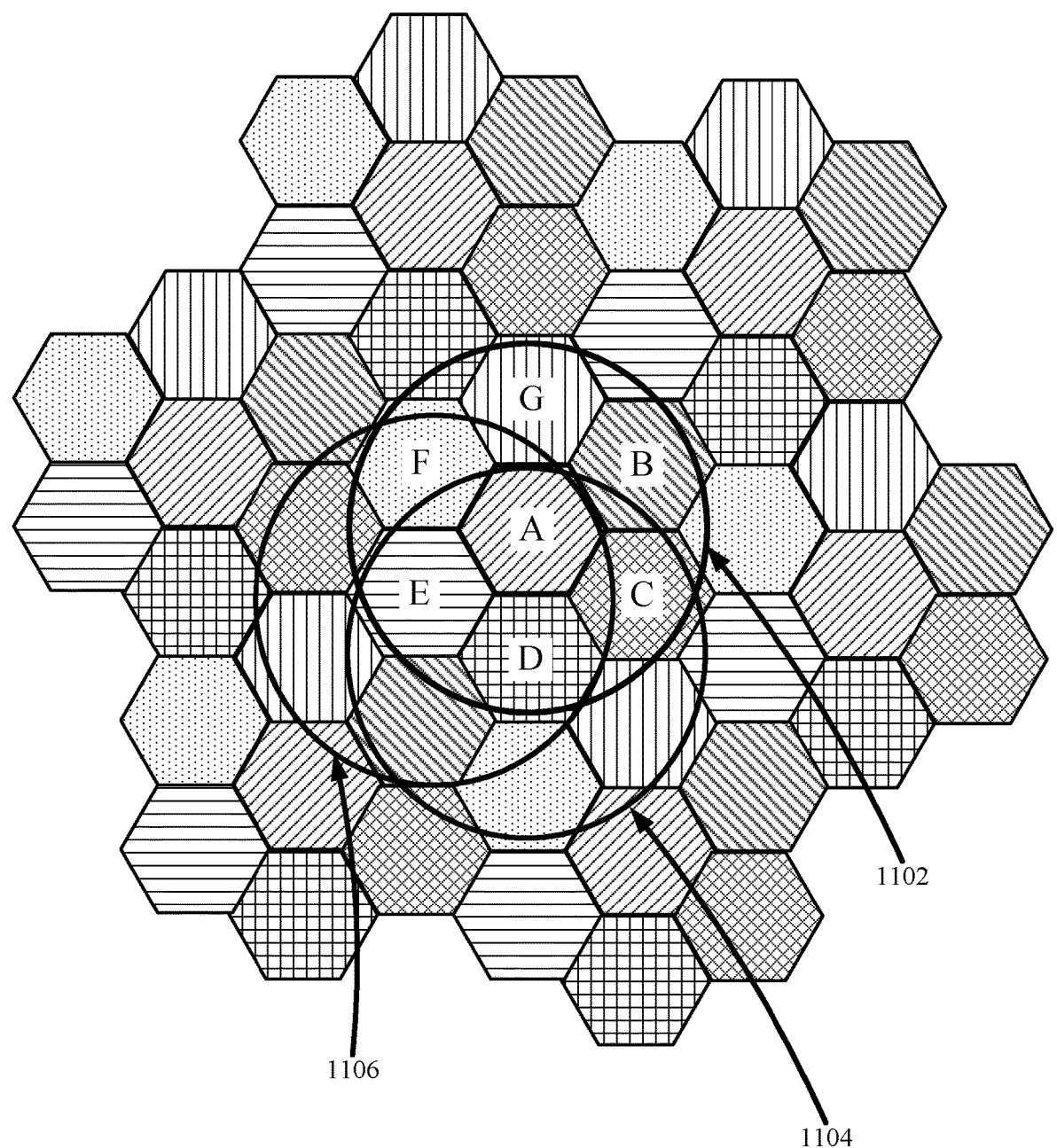
FIG. 11 illustrates an example of a distributed CoMP scenario with overlapping clusters, in accordance with aspects of the present disclosure.

FIG. 11 illustrates an example of a distributed CoMP scenario with overlapping clusters, in accordance with aspects of the present disclosure. This arrangement may help address the above discussed cluster edge interference.

As shown, each cell belongs to multiple clusters. One of the clusters 1102, 1104, and 1106 act as a serving cluster for one or more cells. Scheduling of UEs served by a cell happens at the cell's serving cluster center. For example, in the case shown in FIG. 11, cell "A" in the diagram belongs to multiple clusters 1102, 1104, and 1106, out of which the cluster 1102 (shown cross hatched) is the serving cluster for the cell "A". In this example, cell "A" itself is the cluster center of the serving cluster of the cell "A".

Figure 12:
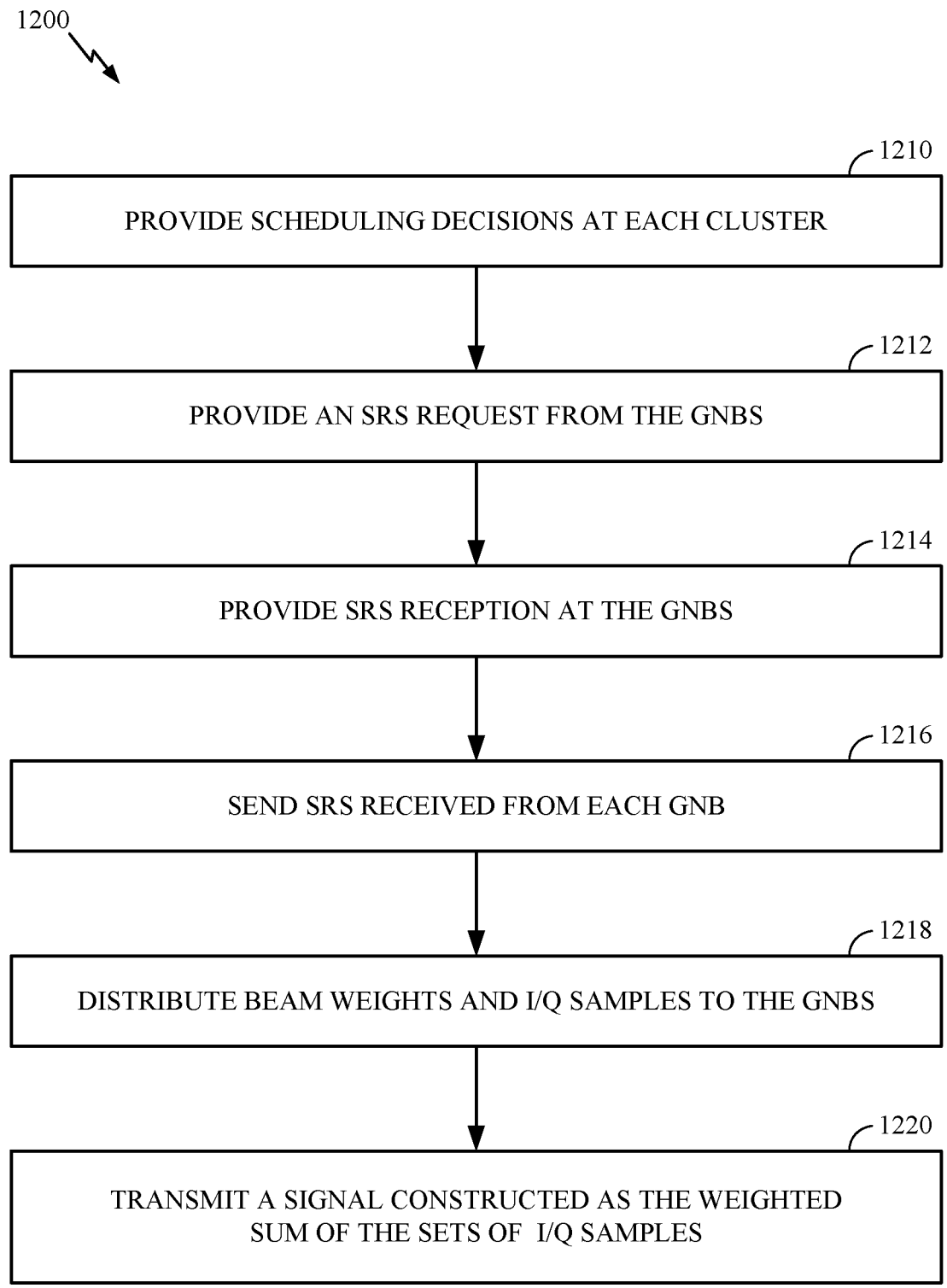
FIG. 12 illustrates an example of a procedure for scheduling a UE in a distributed CoMP scenario, in accordance with aspects of the present disclosure.

For example, a procedure for scheduling the UE may include one or more of the following operations as shown in FIG. 12. Initially, scheduling decisions may be made by each serving cluster center and conveyed to the BSs in the cluster step 1210. The BS may be, for example, a gNB in accordance with one or more cases. An SRS request may be transmitted from the BSs to the UEs being scheduled step 1212. According to one or more examples, the SRS request to a UE may originate from the serving or non-serving cluster centers. Next, SRS transmitted by the UEs are received at BSs step 1214 and then the SRS received from each BS may be sent, for example via backhaul, to the cluster centers the BS belongs to step 1216. Based on the SRS received from the BSs, each cluster center may then compute beam weights. Further, each cluster center may distribute the beam weights and I/Q samples to the BSs of the cluster step 1218. A BS belonging to multiple clusters may use a receiver to receive multiple sets of beam weights and I/Q samples. Accordingly, each BS may then transmit a signal constructed as the weighted summation of the sets of I/Q samples each weighted by the corresponding beam weights step 1220.

For example, if a BS belongs to two clusters 1102 and 1104, then BS may transmit w1 x1+w2 x2, where w1 is the beam weight from the cluster 1202, and x1 is the I/Q sample from the cluster 1102 and w2 is the beam weight from cluster 1104 and x2 is the I/Q sample from the cluster 1104.

Figure 13:
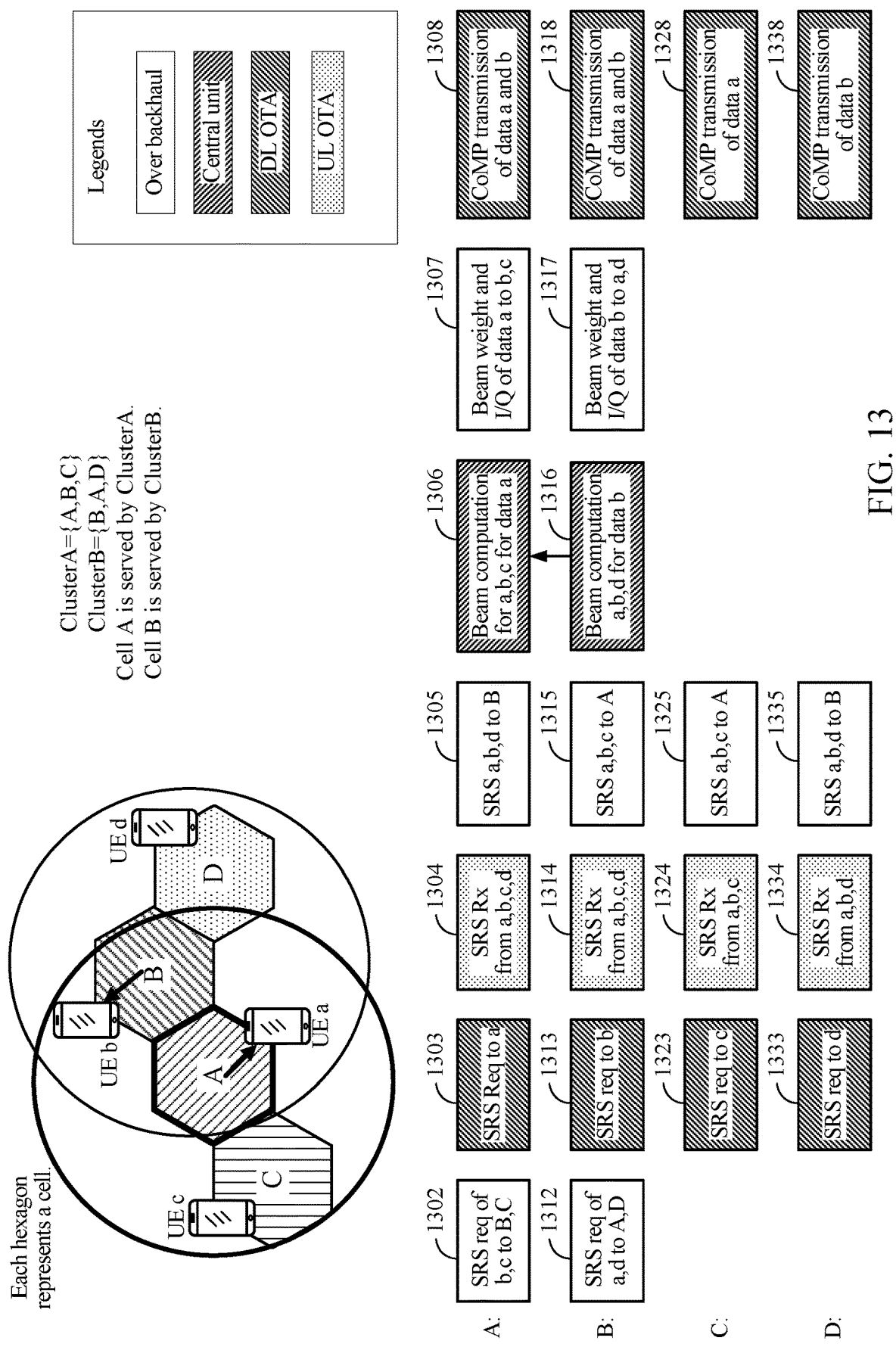
FIG. 13 illustrates an example of communications in a distributed CoMP scenario with overlapping clusters, in accordance with aspects of the present disclosure.

FIG. 13 illustrates an example of communications in a distributed CoMP scenario with overlapping clusters, in accordance with aspects of the present disclosure. As shown, FIG. 13 includes a select number of cells A, B, C, and D that are selectively included in one or more of two clusters. Specifically, as shown cells A, B, and C are in a first cluster with cell A acting as the cluster center that handles scheduling for the first cluster. Additionally, cells A, B, and D are in a second cluster with B acting as the cluster center that handles scheduling for the second cluster. FIG. 13 also shows a plurality of UEs a, b, c, and d that are each located in a serving area of a respective cell A, B, C, and D.

According to one or more cases, some example communications for each cell are shown in FIG. 13. For example the cluster center A may communicate (via backhaul) a request for SRSs of UEs a, b and c to cells A, B and C respectively (operations 1302 and 1303). Likewise, the cluster center B may communicate (via backhaul) a request for SRSs of UEs a, b, and d to cells A, B, and D respectively (operations 1312 and 1313). In response to the SRS request conveyed from the cluster centers, Cells A, B, C, and D transmit SRS requests to UEs a, b, c, and d, respectively. The cell A may then receive SRSs on the UL from UEs (step 1304). The cell A also overhears SRSs that are transmitted from UEs b, c, and d. This is made possible because the cell A belongs to both clusters and therefore is informed of the time/frequency resources allocated for the SRS transmission from UEs b, c, and d. Cell A then conveys the received SRS from UEs a, b, and c to the cluster center A, for example via backhaul. Cell A also conveys the received SRS from UEs a, b, and d to the cluster center B. In a similar manner, cell B receives SRS from UEs a, b, c, and d, conveys SRS from UEs a, b, and c to the cluster center A, and conveys SRS from UEs a, b, and d to the cluster center B. Likewise, cell C receives SRS from UEs a, b, and c and convey them to the cluster center A. Cell C does not know the presence of SRS from UE d, as cell D does not belong to the same cluster. Cell D receives SRS from UEs a, b, and d and convey them to the cluster center B (step 1305). Cell D does not know the presence of SRS from UE c. In this manner, the cluster center A, whose member BSs consist of cells A, B, and C, has obtained the received SRS from every combination of (BS, UE) pairs (A,a), (A,b), (A,c), (B,a), (B,b), (B,c), (C,a), (C,b), (C,c) that are served by the cluster center. According to one or more cases, the "cluster center A" and the "BS A" may be considered separate logical entities. Although both the "cluster center" and "BS" functionalities may be co-located and reside in "A" in one or more cases.

This allows the cluster center A to compute the beam weights to be used by BSs A, B, and C for transmission of data to UE a (step 1306). The beam weight and I/Q of data a may be sent from the cluster center A to BSs A, B and C (step 1307) which are the gNBs belonging to the cluster A. Similarly, beam computation to be used by BSs A, B, and D for transmission of data to UE b may be determined (step 1306) by cluster center B and the beam weight and I/Q of data b may be sent to BSs A, B and D (step 1307) which are the gNBs belonging to the cluster B. Having received the beam weights and I/Q data from the two cluster centers it belongs to, Cell A may then provide a CoMP transmission of data a and b (step 1308). For example, because gNB A belongs to two clusters A and B, then gNB A may transmit w1 x1+w2 x2, where w1 is the beam weight from the cluster A, and x1 is the I/Q sample from the cluster A and w2 is the beam weight from cluster B and x2 is the I/Q sample from the cluster B. Cell B may provide similar operations 1312, 1313, 1314, 1315, 1316, 1317, and 1318 related to the second cluster that cell B serves. Additionally, cells C and D may provide a subset of these operations as shown. In particular cell C may provide operations 1323, 1324, 1325, and 1328 while cell D may provide operations 1333, 1334, 1335, and 1338. Similarly, having received the beam weights and I/Q data from the two cluster centers it belongs to, Cell B may then provide a CoMP transmission of data a and b (step 1318). Cell C may then provide a CoMP transmission of data a (step 1328). Cell D may then provide a CoMP transmission of data b (step 1338).

Example of Sounding Reference Signal (SRS) Coordination, Power Control, and Synchronization for Distributed Coordinated Multipoint (CoMP)

In accordance with one or more aspects of embodiments disclosed herein, methods and apparatus for sounding reference signal (SRS) coordination, power control, and synchronization for distributed coordinated multipoint (CoMP) using communications systems operating according to new radio (NR) technologies are provided.

One or more cases as described herein may be provided on a very large area CoMP deployment. When deploying Coordinated multipoint (CoMP) in a large area, either a central CoMP or a distributed CoMP approach may be used. As noted, a central CoMP may encounter difficulties due to backhaul limitation and computation complexity. Another approach may include a distributed CoMP which provides advantages such as the ability to have scheduling happen at multiple distributed locations within the CoMP network. Also, with distributed CoMP, coordination for control and data exchange is limited to a small geographic area around the serving cell. In accordance with one or more cases, in order to cope with complexity, a distributed CoMP with overlapping clusters may be provided along with SRS coordination, power control, and synchronization among the overlapping clusters.

Figure 14:
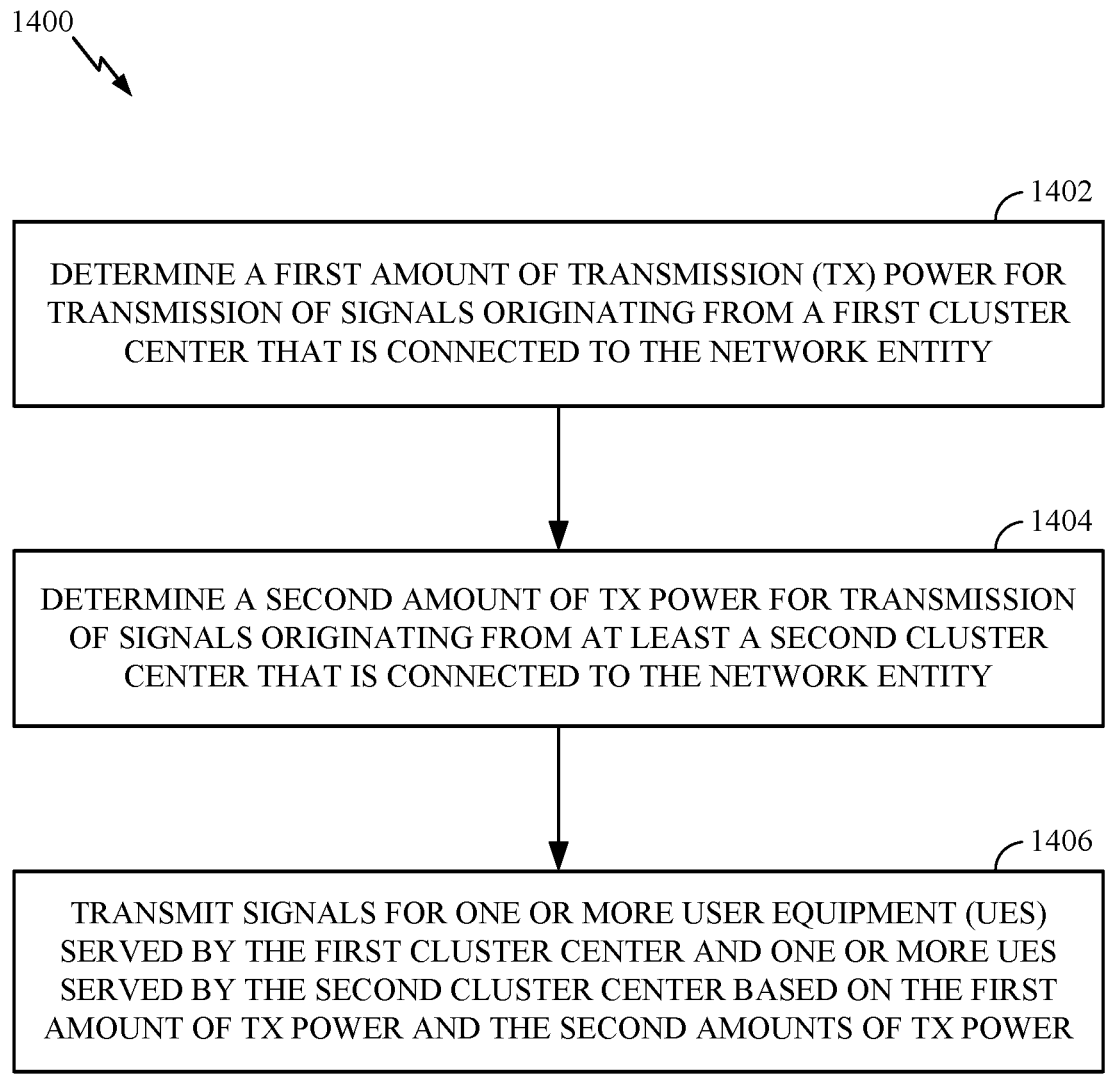
FIG. 14 illustrates example operations for wireless communications by a network entity, in accordance with aspects of the present disclosure.

For example, FIG. 14 illustrates example operations for wireless communications by network entity such as, for example, a base station (BS), in accordance with aspects of the present disclosure.

Figure 19:
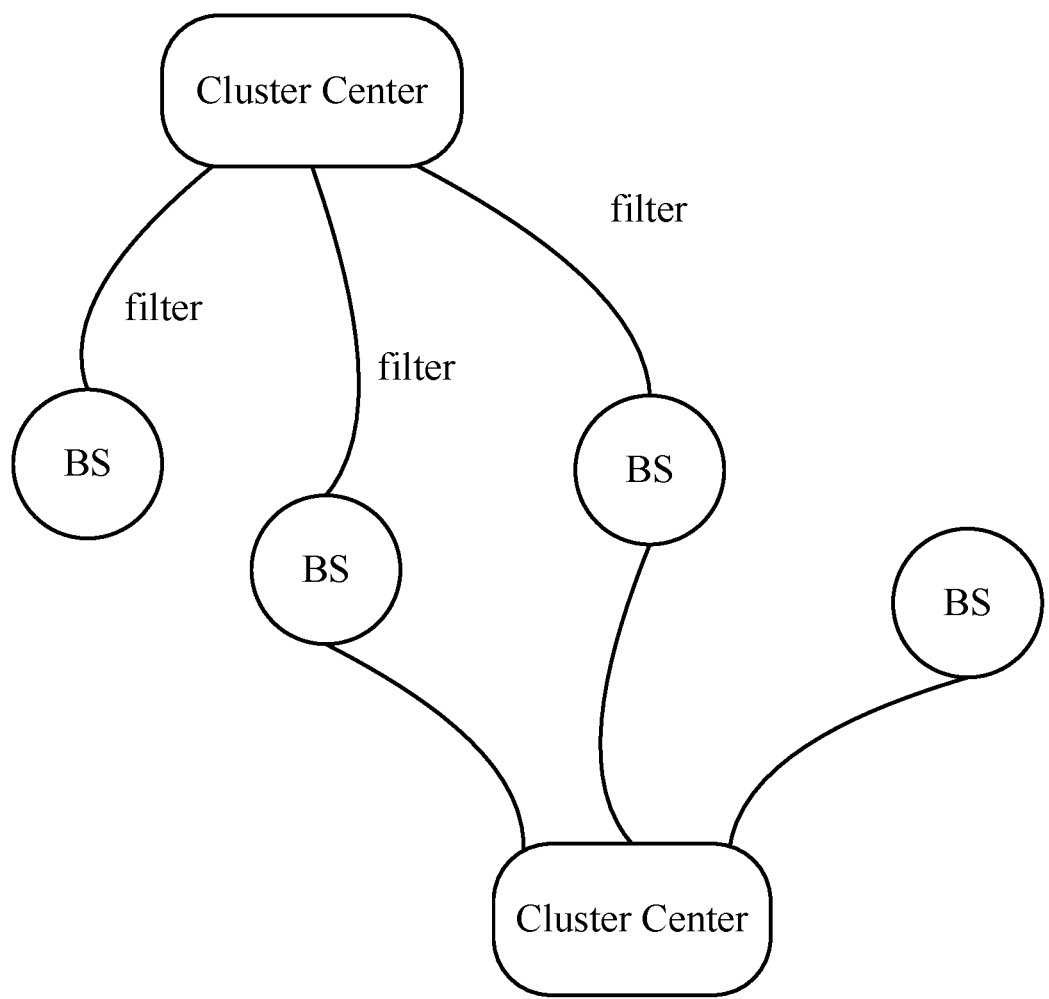
FIG. 19 illustrates an example of a wireless communication architecture that includes cluster centers and base stations, in accordance with aspects of the present disclosure.

Specifically, operations 1400 begin, at block 1402, with determining a first amount of transmission (Tx) power for transmission of signals originating from a first cluster center that is connected to the network entity. The operations 1400 also include, at block 1404, determining a second amount of Tx power for transmission of signals originating from at least a second cluster center that is connected to the network entity. Further, the operations 1400 include, at block 1406, transmitting signals for one or more user equipment (UEs) served by the first cluster center and one or more UEs served by the second cluster center based on the first amount of Tx power and the second amounts of Tx power. In some cases, the network entity may further include an operation for generating power allocation information that includes at least the first amount of Tx power and the second amount of Tx power. Further, the network entity may communicate the power allocation information to both the first and second cluster centers According to one or more cases, network entity may include a cluster center that may refer to a central processor that performs scheduling, beam weight computation, and baseband processing and connected via fiber to one or more network entities such as, for example, base stations as shown in FIG. 19. Further, depending on the network architecture a network entity may include a cluster center that may be a gNB, and a connected network entity may be a BS that may be an RRH (remote radio head) or a TRP (transmission reception point). In other cases, a network entity may be a cluster center that may be a central HW/SW equipment with high processing capability, and a connected network entity may be a BS that may be a gNB. Other combinations are also possible in accordance with one or more cases.

Figure 20A:
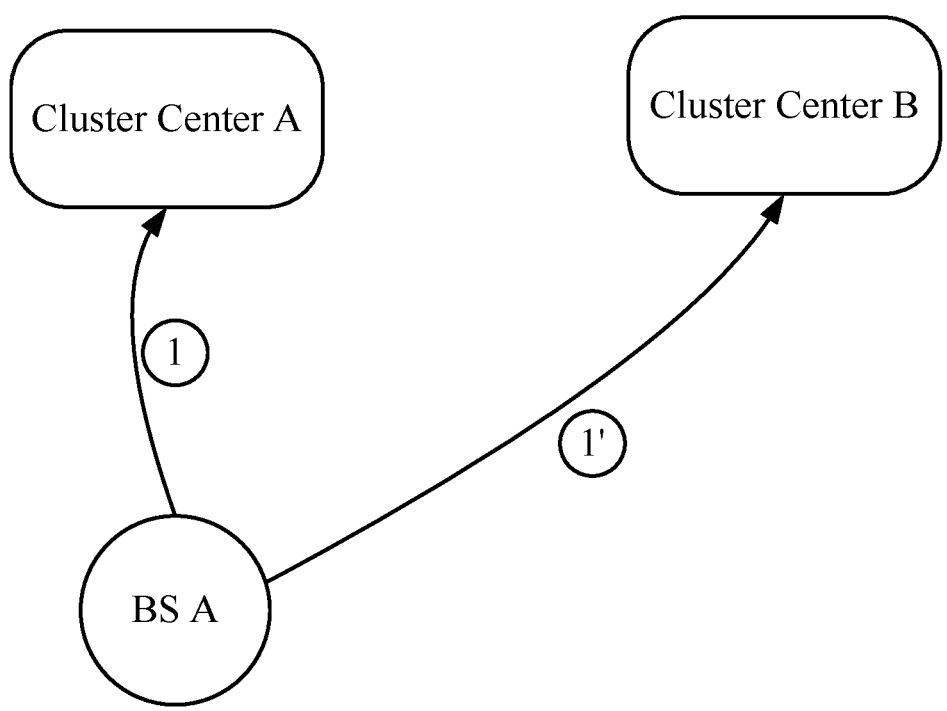
FIG. 20A illustrates an example of a wireless communication between cluster centers and a base station, in accordance with aspects of the present disclosure.
Figure 20B:
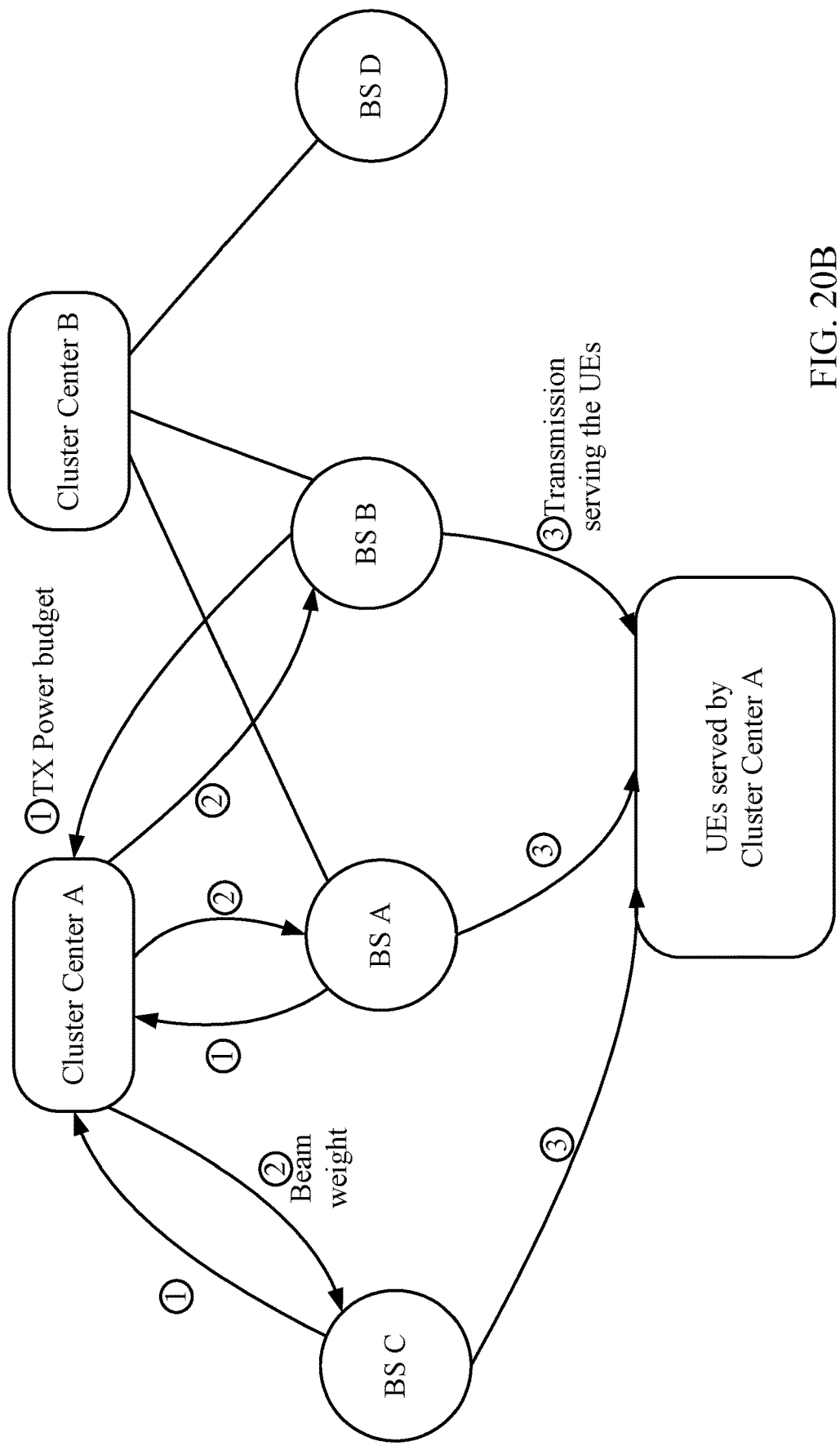
FIG. 20B illustrates an example of a wireless communication between cluster centers, base stations, and UEs, in accordance with aspects of the present disclosure.

In accordance with some cases, a BS may further generate power allocation information that includes at least the first amount of Tx power for a first cluster A and the second amount of Tx power for a first cluster B. The BS may then communicate the power allocation information to both the first cluster center and the second cluster center as shown in FIG. 20A. Further, as shown in FIG. 20B, a BS may receive beam weights (shown as an arrow labeled with the numeral 2) from at least one of the first and second cluster centers. Specifically, FIG. 20B shows that the at least one of the first and second cluster centers may receive the power allocation information (shown as an arrow labeled with the numeral 1) from one or more BSs connected to at least one of the first and second cluster centers, and compute the beam weights, for the one or more BSs for serving one or more UEs served by at least one of the first and second cluster centers, based on constraints provided by the power allocation information. Arrows labeled with the numeral 3 represent transmissions from BSs to the UEs.

In some cases, a power allocation embodiment may include a cell that belongs to multiple clusters that allocates the cell's Tx power across the clusters. Specifically, in accordance with one example, the cell may allocate 70 percent of the Tx power for a serving cluster, while allocating 10 percent of the Tx power for each of the three non-serving clusters the cell also belongs to. This power allocation information may then be communicated to the serving and non-serving clusters. Each cluster may then compute beam weights with the power budget constraint provided in the power allocation information. One technical implication that may occur in one or more cases includes a scenario where a BS ("A") may not provide full protection ("nulling") to its served UE ("a") from interference caused by a neighboring BS ("B") served by a different cluster, if the power budget the cell "A" allocated to the different cluster is not sufficient.

Figure 21:
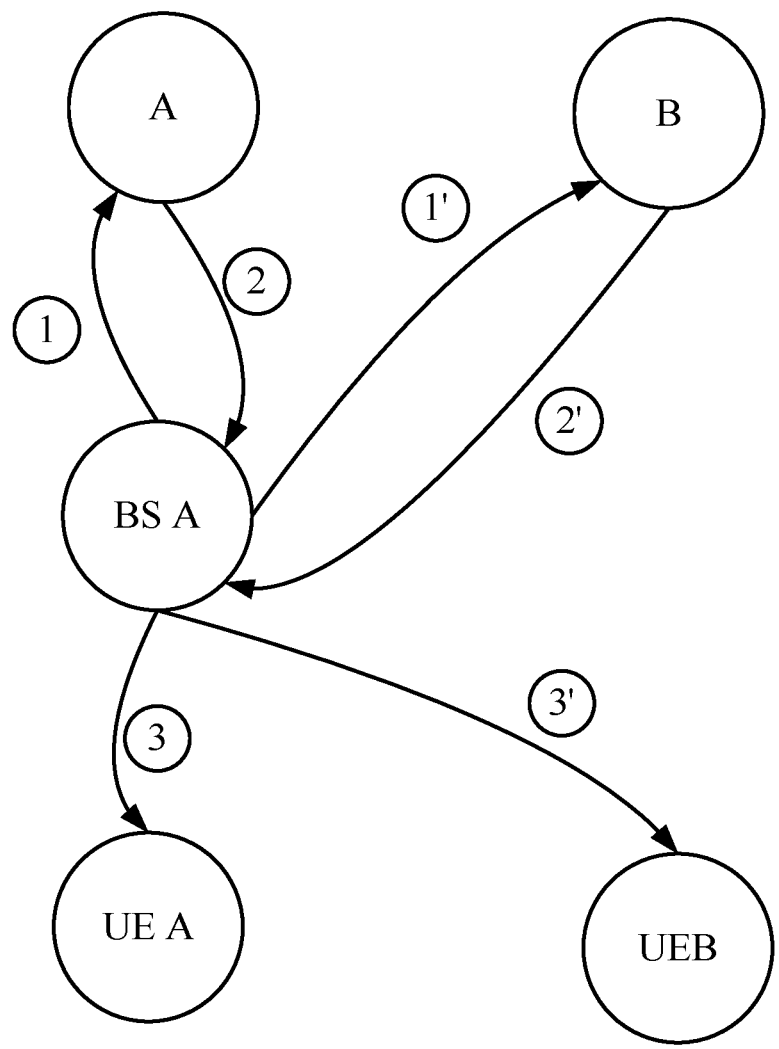
FIG. 21 illustrates an example of a wireless communication between cluster centers, a base station, and UEs, in accordance with aspects of the present disclosure.

According to one or more cases, a first cluster center may be a serving cluster and a second cluster center may be a non-serving cluster. Further, as shown in FIG. 21, the first amount of Tx power may be configured for transmitting data originating from the first cluster center A to the one or more UEs UEA and UEB served by the first cluster center A. Further a second amount of Tx power may be configured for transmitting data originating from the second cluster center B to the one or more UEs UEA and UEB served by the second cluster center B. According to one or more cases, beam weights 1, 1', 2, 2', 3, or 3' at the BS for transmitting data by the second (i.e. non-serving) cluster center may be set such that the interference caused by the second cluster center toward the UEs served by the first cluster center is minimized.

Figure 15:
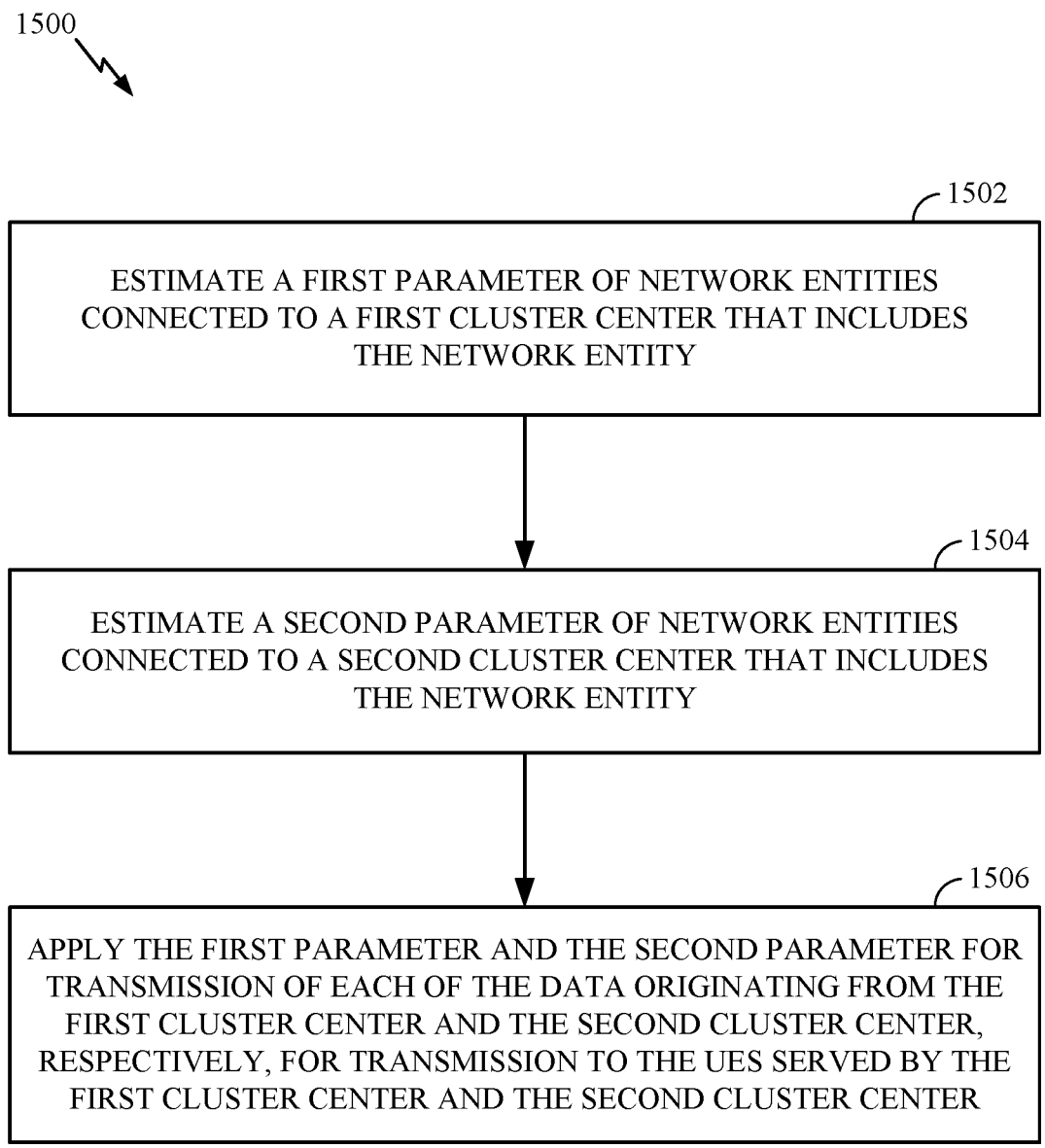
FIG. 15 illustrates example operations for wireless communications by a network entity, in accordance with aspects of the present disclosure.

FIG. 15 illustrates example operations for wireless communications by a network entity, in accordance with aspects of the present disclosure. The operations 1500 begin, at block 1502, with estimating a first parameter of network entities connected to a first cluster center that includes the network entity. The operations 1500 also include, at block 1504, estimating a second parameter of network entities connected to a second cluster center that includes the network entity. Further, operations 1500 include, at block 1506, applying the first parameter and the second parameter for transmission of each of the data originating from the first cluster center and the second cluster center, respectively, for transmission to one or more UEs served by the first cluster center and the second cluster center.

Figure 16:
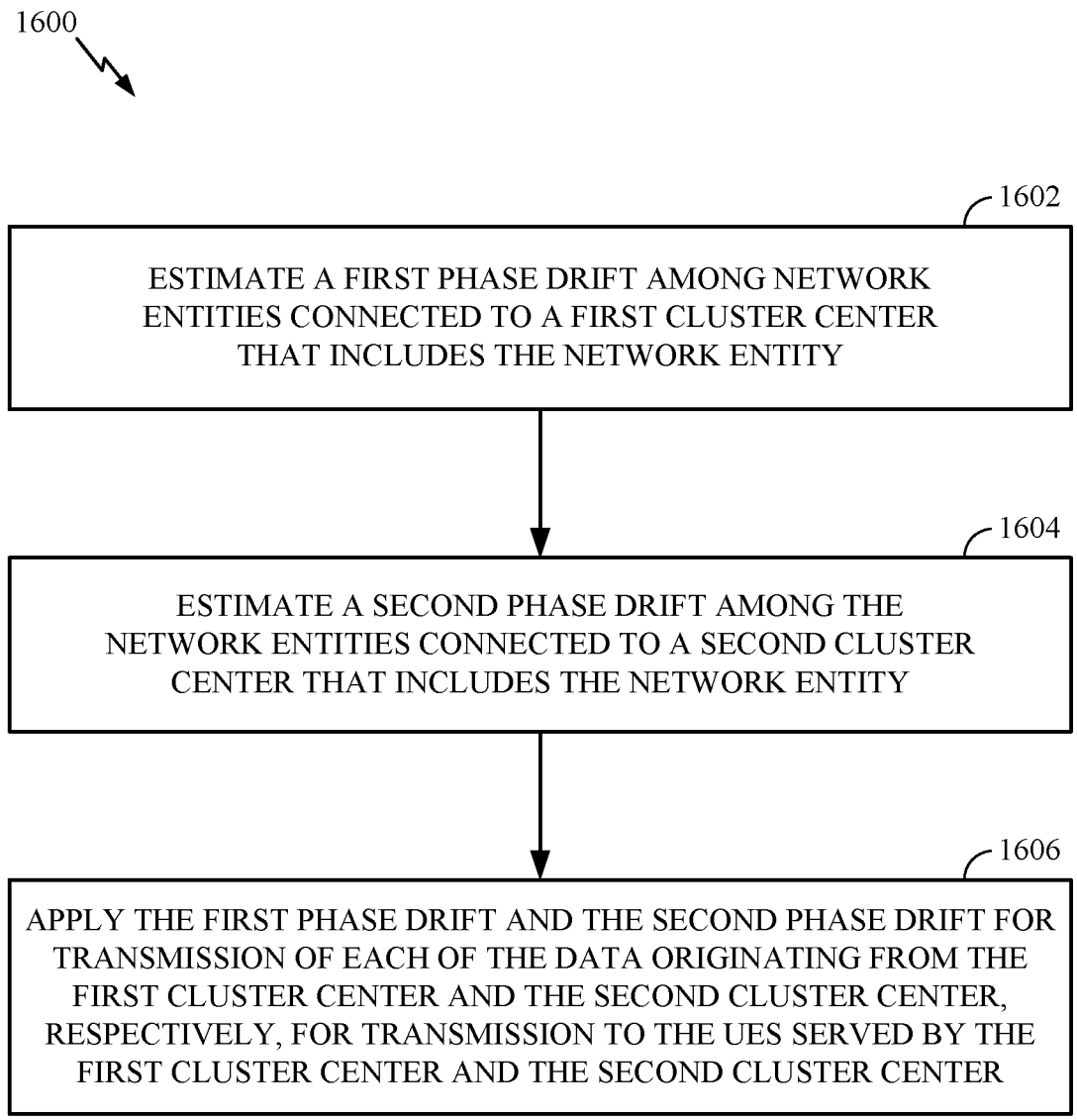
FIG. 16 illustrates example operations for wireless communications by a network entity, in accordance with aspects of the present disclosure.

FIG. 16 illustrates example operations for wireless communications by a network entity, in accordance with aspects of the present disclosure. Specifically, operations 1600 begin, at block 1602, with estimating a first phase drift among network entities such as, for example BSs, connected to a first cluster center that includes the network entity such as a BS. The operations 1600 also include, at block 1604, estimating a second phase drift among the network entities connected to a second cluster center that includes the network entity. Further, operations 1600 include, at block 1606, applying the first phase drift and the second phase drift for transmission of each of the data originating from the first cluster center and the second cluster center, respectively, for transmission to the UEs served by the first cluster center and the second cluster center.

Figure 17:
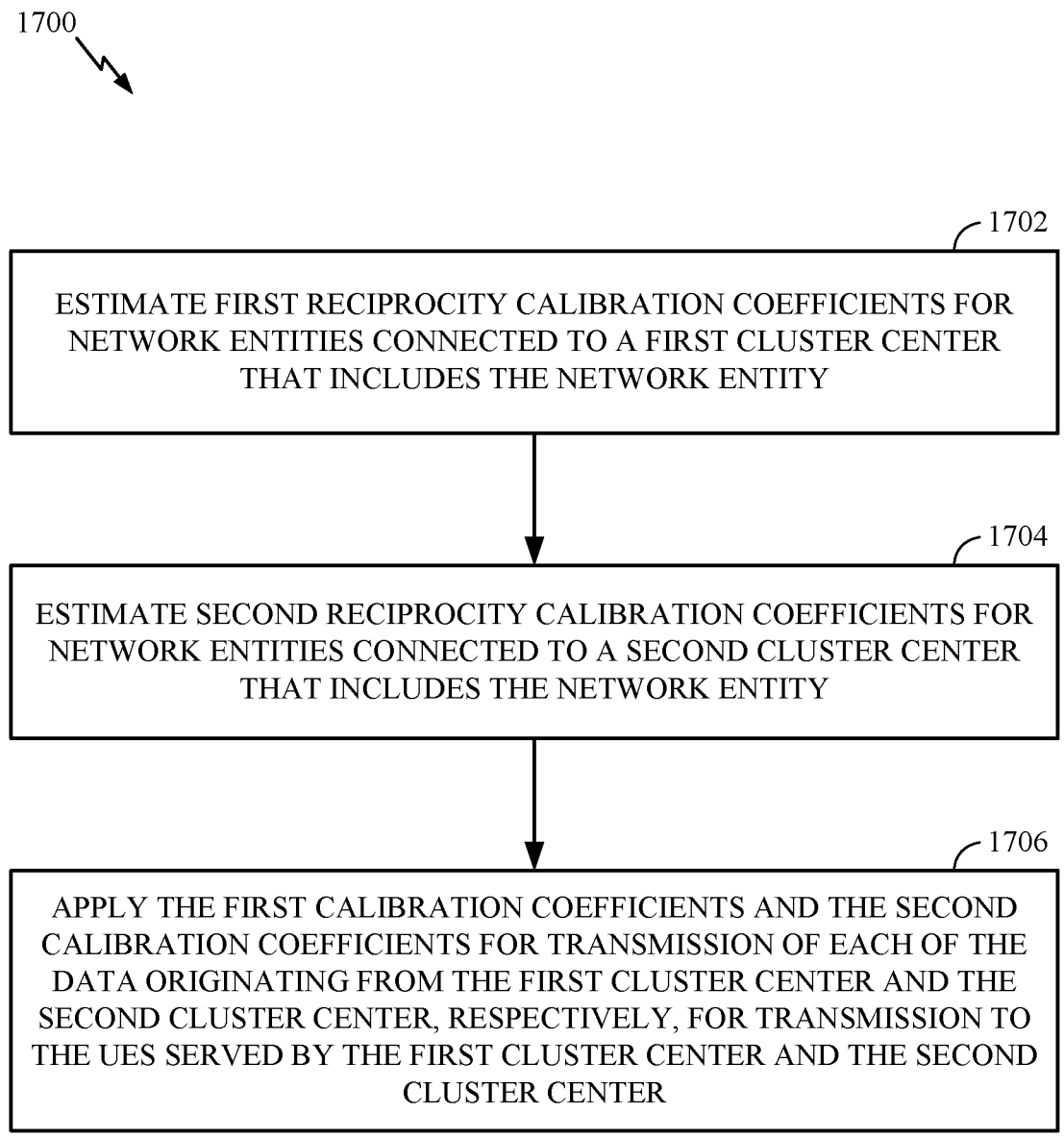
FIG. 17 illustrates example operations for wireless communications by a network entity, in accordance with aspects of the present disclosure.

FIG. 17 illustrates example operations for wireless communications by a network entity, in accordance with aspects of the present disclosure. Specifically, operations 1700 begin, at block 1702, with estimating first reciprocity calibration coefficients for network entities connected to a first cluster center that includes the network entity. The operations 1700 also include, at block 1704, estimating second reciprocity calibration coefficients for network entities connected to a second cluster center that includes the network entity. Further, operations 1700 include, at block 1706, applying the first calibration coefficients and the second calibration coefficients for transmission of each of the data originating from the first cluster center and the second cluster center, respectively, for transmission to the UEs served by the first cluster center and the second cluster center.

Figure 18:
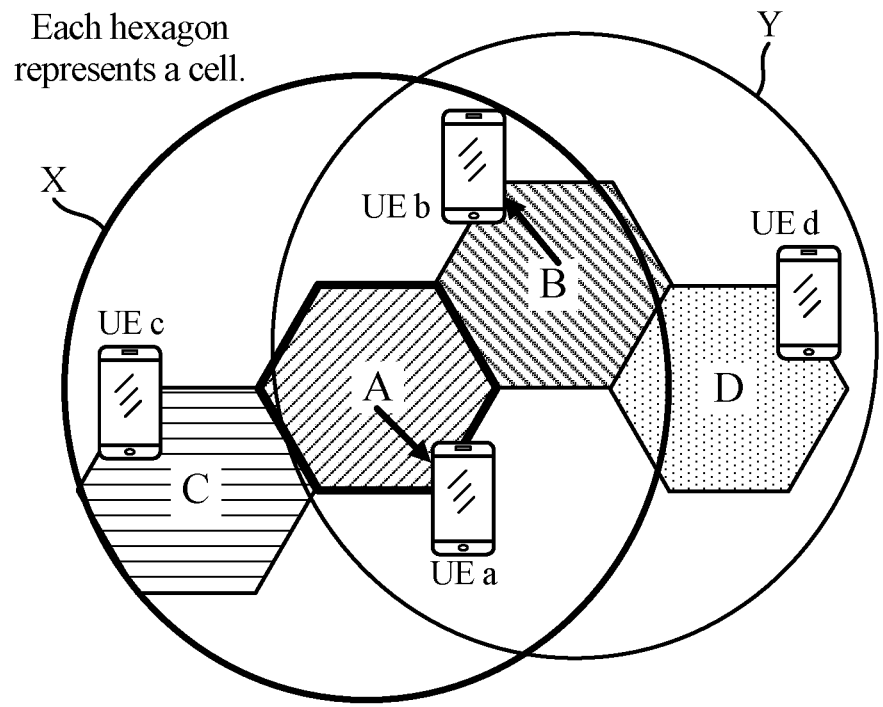
FIG. 18 illustrates an example of phase synchronization across clusters making up a portion of a distributed CoMP scenario with overlapping clusters, in accordance with aspects of the present disclosure.

In accordance with one or more cases, phase synchronization across clusters may be provided. For example, FIG. 18 illustrates an example of phase synchronization across clusters making up a portion of a distributed CoMP scenario with overlapping clusters, in accordance with aspects of the present disclosure.

Currently, a phase synchronization procedure within a cluster is provided that may include, for example, over-the-air phase synchronization for reciprocity-based CoMP joint transmission. For example, an inter-gNB approach may be provided that includes a set of gNBs that exchange phase sync RS to obtain relative phase information among the gNBs. According to another example, a UE-assisted approach may be provided that includes a set of gNBs that exchange phase sync RS with one or more UEs to estimate relative phase drift among the gNBs.

Phase synchronization across multiple clusters may be provided with one or more of a number of different features. For example, each cluster may independently estimate the relative phase drift among the gNBs in the cluster as in the above. Particularly, resources for phase synchronization RS (inter-gNB, DL, and UL) may be orthogonalized among neighboring clusters. Further, according to one or more cases, each cluster may apply the estimated phase for transmission from the cluster. For example, looking at FIG. 18, cell "A" may transmit data intended to UE "a" (computed by the serving cluster of "A"; denoted as "X") and data intended to UE "b" (computed by the non-serving cluster; denoted as "Y"). This may be written as $y=w_{aA}x_{aA}+w_{bA}x_{bA}$. Cluster X and Y may independently come up with phase drift estimate. The phase drift estimate may be denoted within cluster X for cells A,B,C as $\{\phi_{XA}, \phi_{XB}, \phi_{XC}\}$ and the phase drift estimate within cluster Y for cells A,B,D as $\{\phi_{XA}, \phi_{XN}, \phi_{XD}\}$.

Accordingly, in one or more examples, with phase correction may include the following:

$$\text{Cell "}A\text{" transmits } y = e^{-j\phi_{XA}} w_{aA}x_{aA} + e^{-\phi_{YA}} w_{bA}x_{bA}$$

$$\text{Cell "}C\text{" transmits } y = e^{-j\phi_{XC}} w_{aC}x_{aC}$$

$$\text{Cell "}B\text{" transmits } y = e^{-j\phi_{XB}} w_{aB}x_{aB} + e^{-\phi_{YB}} w_{bB}x_{bB}$$

$$\text{Cell "}D\text{" transmits } y = e^{-j\phi_{YD}} w_{bD}x_{bD}$$

In the above, the lower case 'a' and 'b' in the subscript denotes the cluster from which the phase value, the beam weight, and the data originated. In this way, the phase sync across clusters may be implicitly achieved.

According to one or more cases, reciprocity calibration across multiple clusters may be provided. Currently, reciprocity calibration within a single cluster is provided that includes one or more of an inter-gNB approach and/or a UE-assisted approach. According to one or more cases, reciprocity calibration across multiple clusters is achieved in the similar manner as the phase sync is extended to multiple clusters. For example, each cluster may independently estimate reciprocity calibration coefficients for its own gNBs. Particularly, resources for calibration RS (inter-gNB, DL, and UL) may need to be orthogonalized among neighboring clusters. Further, according to one or more cases, each cluster may apply the calibration coefficients for transmission from the cluster. In this way, the reciprocity calibration across multiple clusters may be implicitly achieved.

Figure 22:
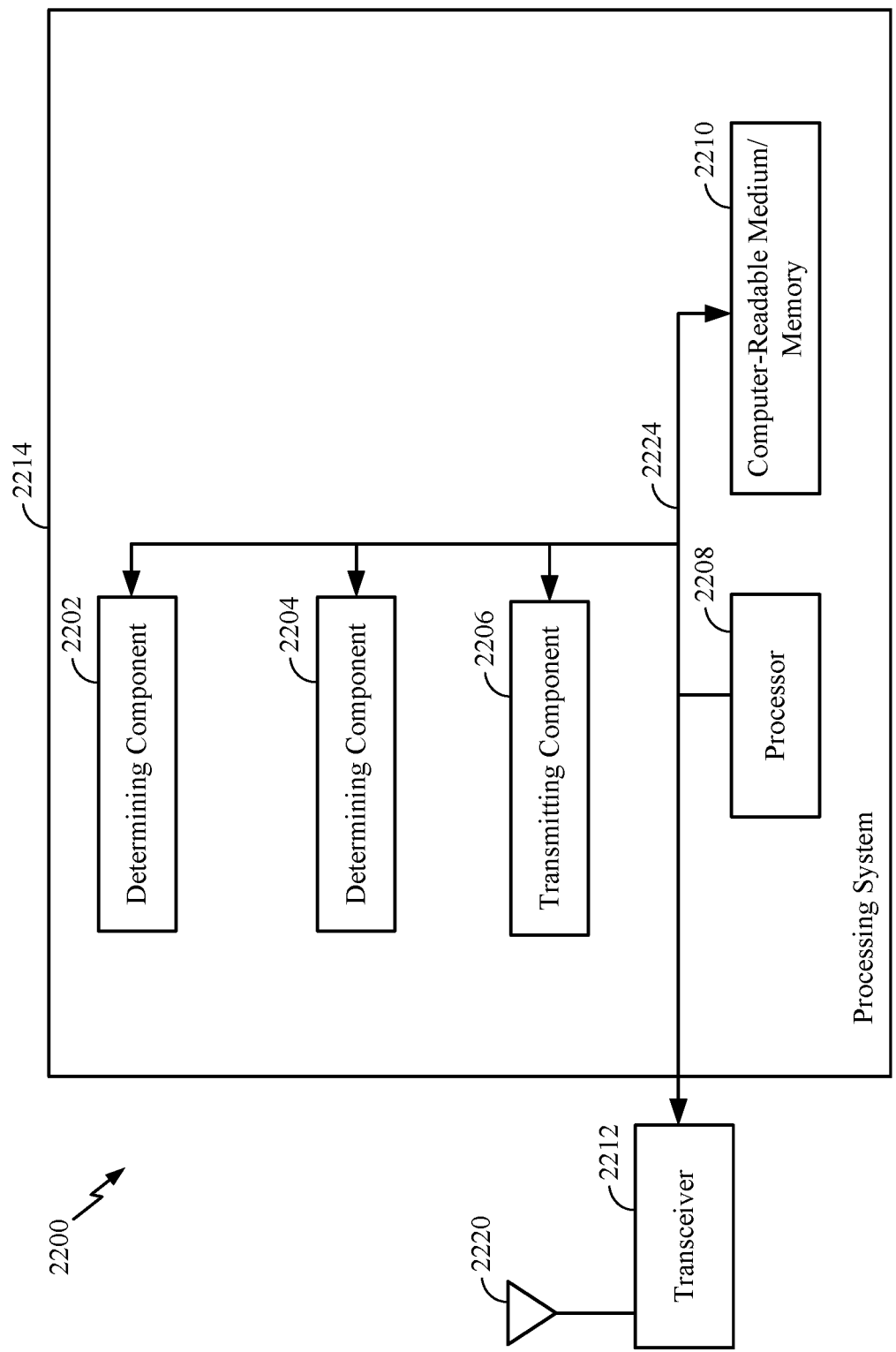
FIG. 22 illustrates a communications device that may include various components configured to perform operations for the techniques disclosed herein in accordance with aspects of the present disclosure.

FIG. 22 illustrates a communications device 2200 that may include various components (e.g., corresponding to means-plus-function components) configured to perform operations for the techniques disclosed herein, such as the operations 1400 illustrated in FIG. 14. The communications device 2200 includes a processing system 2214 coupled to a transceiver 2212. The transceiver 2212 is configured to transmit and receive signals for the communications device 2200 via an antenna 2220, such as the various signal described herein. The processing system 2214 may be configured to perform processing functions for the communications device 2200, including processing signals received and/or to be transmitted by the communications device 2200.

The processing system 2214 includes a processor 2208 coupled to a computer-readable medium/memory 2210 via a bus 2224. In certain aspects, the computer-readable medium/memory 2210 is configured to store instructions that when executed by processor 2208, cause the processor 2208 to perform the operations illustrated in FIG. 14, or other operations for performing the various techniques discussed herein.

In certain aspects, the processing system 2214 further includes a determining component 2202 for performing the operations illustrated at 1402 in FIG. 14. The processing system 2214 also includes a determining component 2204 for performing the operations illustrated at 1404 in FIG. 14. Additionally, the processing system 2214 includes a transmitting component 2206 for performing the operations illustrated at 1406 in FIG. 14.

The determining component 2202, determining component 2204, and transmitting component 2206 may be coupled to the processor 2208 via bus 2224. In certain aspects, determining component 2202, determining component 2204, and transmitting component 2206 may be hardware circuits. In certain aspects, the determining component 2202, determining component 2204, and transmitting component 2206 may be software components that are executed and run on processor 2208.

Figure 23:
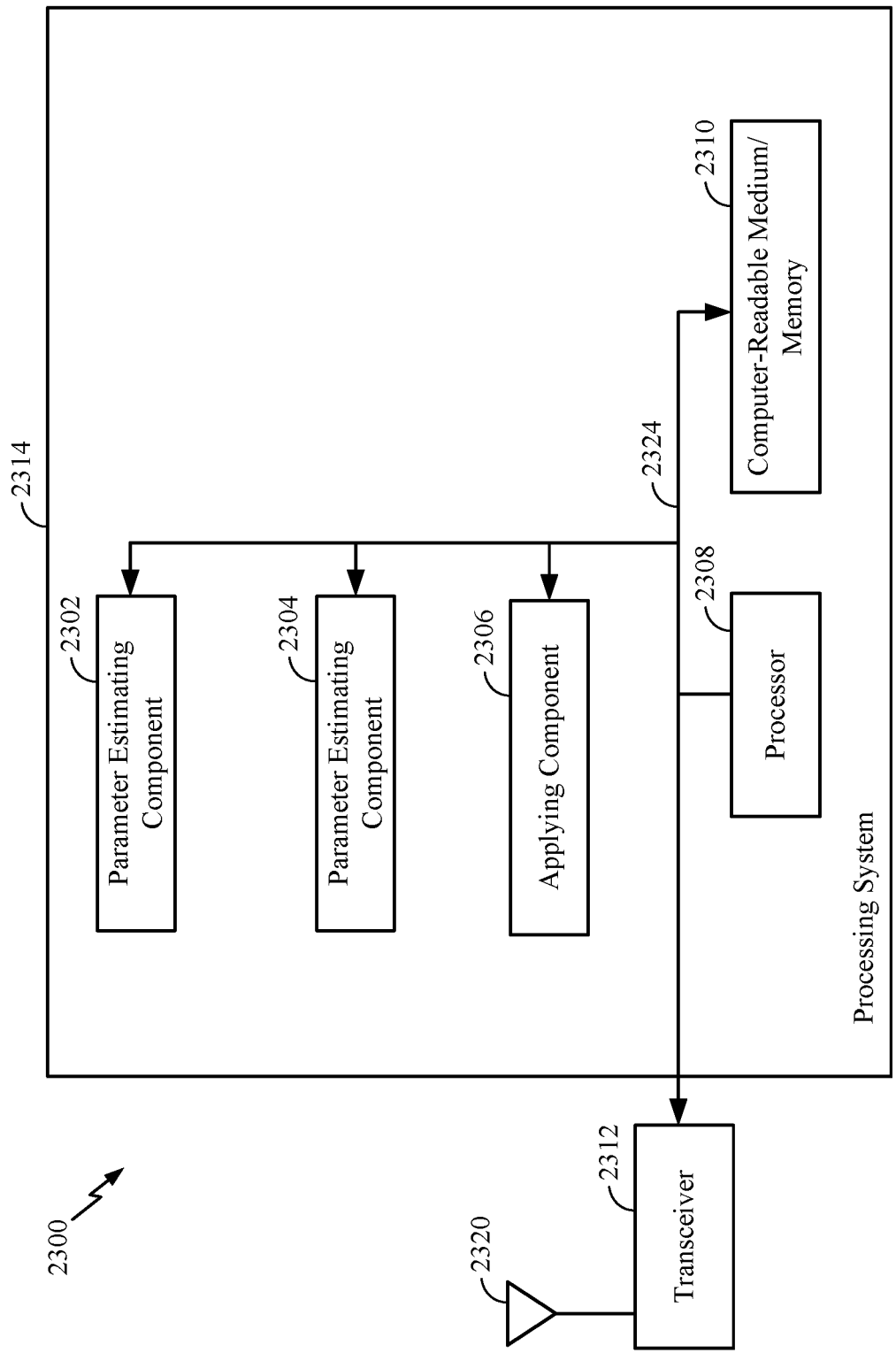
FIG. 23 illustrates a communications device that may include various components configured to perform operations for the techniques disclosed herein in accordance with aspects of the present disclosure.

FIG. 23 illustrates a communications device 2300 that may include various components (e.g., corresponding to means-plus-function components) configured to perform operations for the techniques disclosed herein, such as the operations 1500 illustrated in FIG. 15. The communications device 2300 includes a processing system 2314 coupled to a transceiver 2312. The transceiver 2312 is configured to transmit and receive signals for the communications device 2300 via an antenna 2320, such as the various signal described herein. The processing system 2314 may be configured to perform processing functions for the communications device 2300, including processing signals received and/or to be transmitted by the communications device 2300.

The processing system 2314 includes a processor 2308 coupled to a computer-readable medium/memory 2310 via a bus 2324. In certain aspects, the computer-readable medium/memory 2310 is configured to store instructions that when executed by processor 2308, cause the processor 2308 to perform the operations illustrated in FIG. 15, or other operations for performing the various techniques discussed herein.

In certain aspects, the processing system 2314 further includes an estimating component 2302 for performing the operations illustrated at 1502 in FIG. 15. The processing system 2314 also includes an estimating component 2304 for performing the operations illustrated at 1504 in FIG. 15. Additionally, the processing system 2314 includes an applying component 2306 for performing the operations illustrated at 1506 in FIG. 15.

The estimating component 2302, estimating component 2304, and applying component 2306 may be coupled to the processor 2308 via bus 2324. In certain aspects, estimating component 2302, estimating component 2304, and applying component 2306 may be hardware circuits. In certain aspects, the estimating component 2302, estimating component 2304, and applying component 2306 may be software components that are executed and run on processor 2308.

Figure 24:
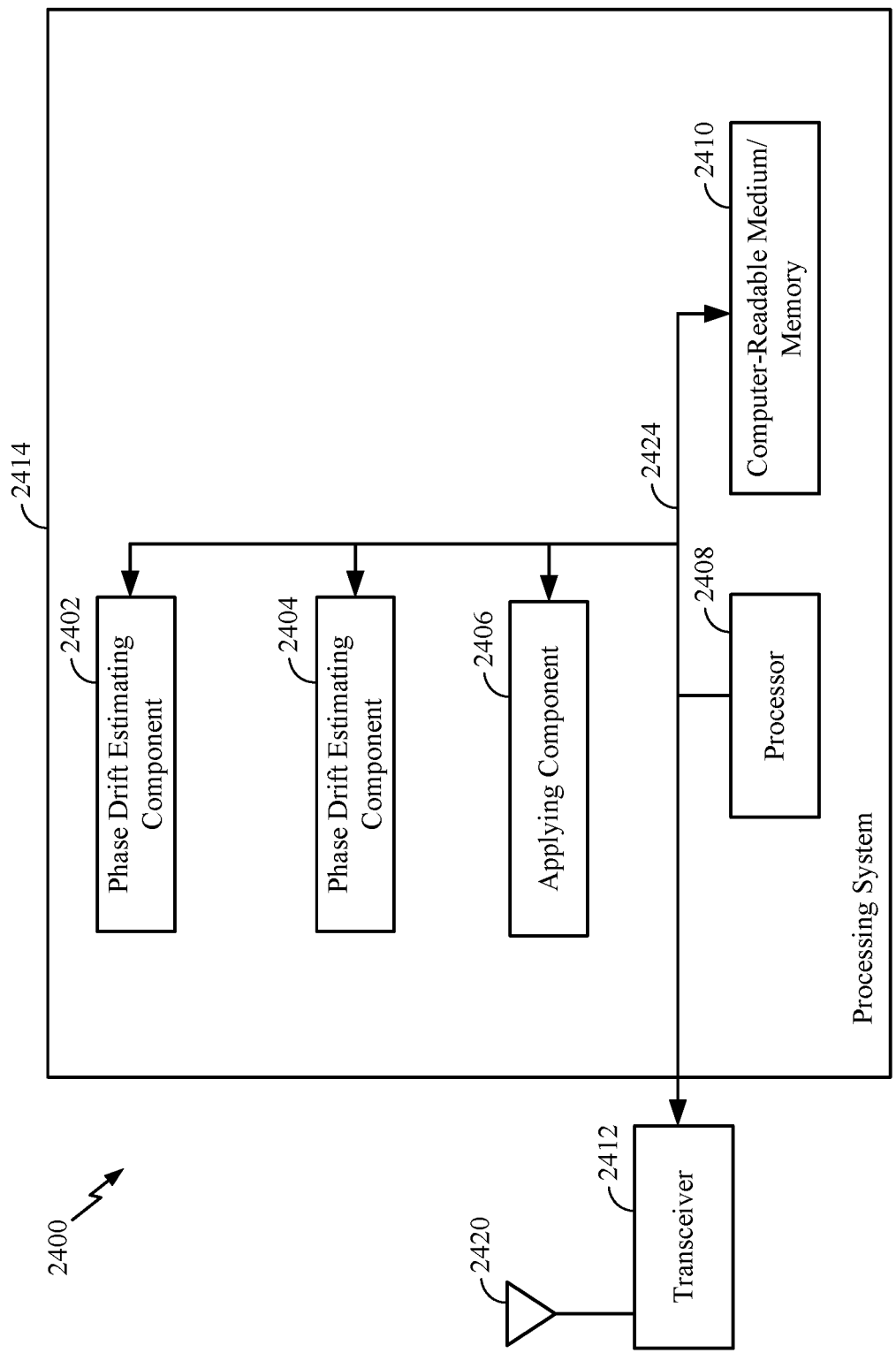
FIG. 24 illustrates a communications device that may include various components configured to perform operations for the techniques disclosed herein in accordance with aspects of the present disclosure.

FIG. 24 illustrates a communications device 2400 that may include various components (e.g., corresponding to means-plus-function components) configured to perform operations for the techniques disclosed herein, such as the operations 1600 illustrated in FIG. 16. The communications device 2400 includes a processing system 2414 coupled to a transceiver 2412. The transceiver 2412 is configured to transmit and receive signals for the communications device 2400 via an antenna 2420, such as the various signal described herein. The processing system 2414 may be configured to perform processing functions for the communications device 2400, including processing signals received and/or to be transmitted by the communications device 2400.

The processing system 2414 includes a processor 2408 coupled to a computer-readable medium/memory 2410 via a bus 2424. In certain aspects, the computer-readable medium/memory 2410 is configured to store instructions that when executed by processor 2408, cause the processor 2408 to perform the operations illustrated in FIG. 16, or other operations for performing the various techniques discussed herein.

In certain aspects, the processing system 2414 further includes an estimating component 2402 for performing the operations illustrated at 1602 in FIG. 16. The processing system 2414 also includes an estimating component 2404 for performing the operations illustrated at 1604 in FIG. 16. Additionally, the processing system 2414 includes an applying component 2406 for performing the operations illustrated at 1606 in FIG. 16.

The estimating component 2402, estimating component 2404, and applying component 2406 may be coupled to the processor 2408 via bus 2424. In certain aspects, estimating component 2402, estimating component 2404, and applying component 2406 may be hardware circuits. In certain aspects, the estimating component 2402, estimating component 2404, and applying component 2406 may be software components that are executed and run on processor 2408.

Figure 25:
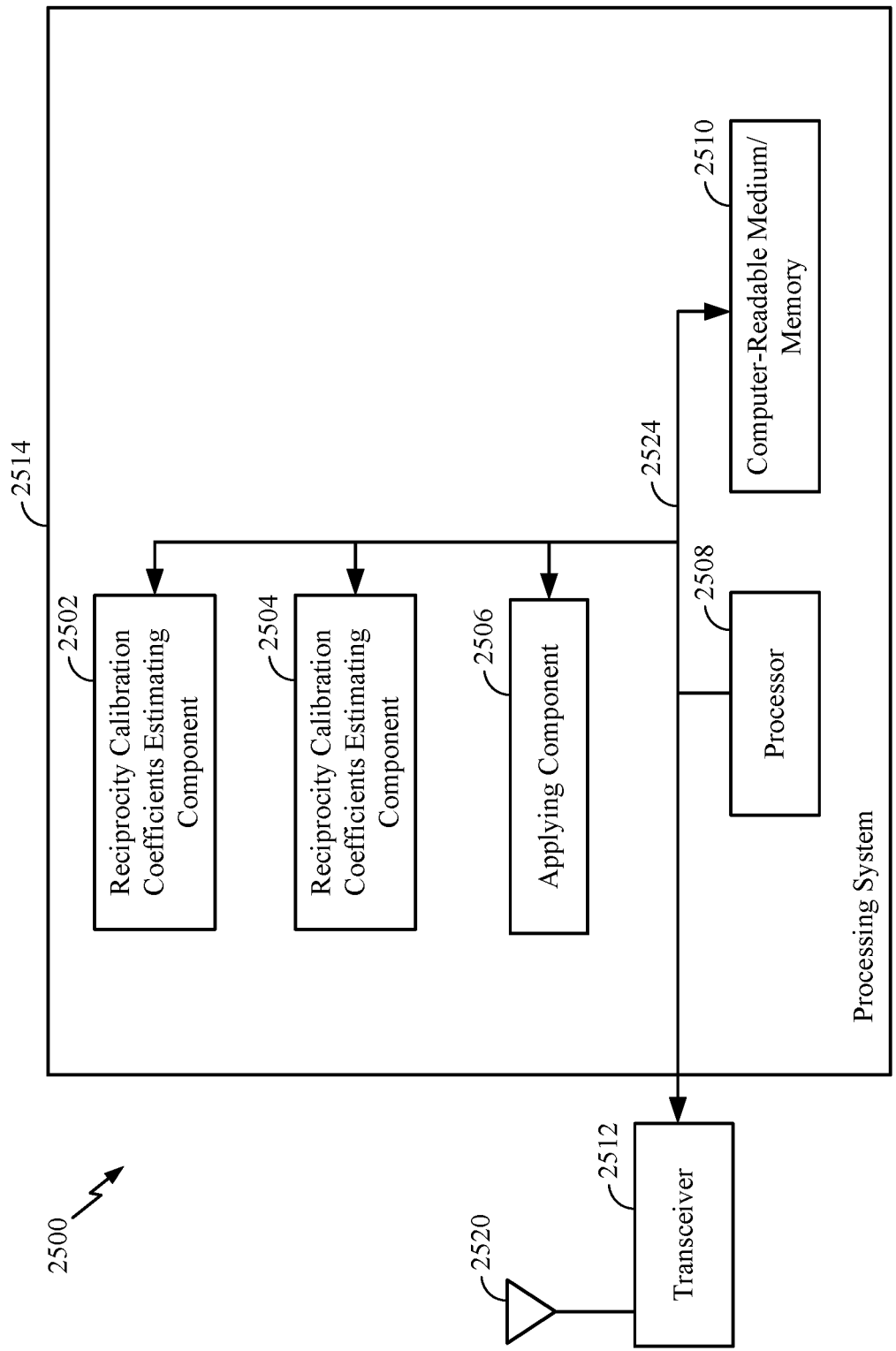
FIG. 25 illustrates a communications device that may include various components configured to perform operations for the techniques disclosed herein in accordance with aspects of the present disclosure.

FIG. 25 illustrates a communications device 2500 that may include various components (e.g., corresponding to means-plus-function components) configured to perform operations for the techniques disclosed herein, such as the operations 1700 illustrated in FIG. 17. The communications device 2500 includes a processing system 2514 coupled to a transceiver 2512. The transceiver 2512 is configured to transmit and receive signals for the communications device 2500 via an antenna 2520, such as the various signal described herein. The processing system 2514 may be configured to perform processing functions for the communications device 2500, including processing signals received and/or to be transmitted by the communications device 2500.

The processing system 2514 includes a processor 2508 coupled to a computer-readable medium/memory 2510 via a bus 2524. In certain aspects, the computer-readable medium/memory 2510 is configured to store instructions that when executed by processor 2508, cause the processor 2508 to perform the operations illustrated in FIG. 17, or other operations for performing the various techniques discussed herein.

In certain aspects, the processing system 2514 further includes an estimating component 2502 for performing the operations illustrated at 1702 in FIG. 17. The processing system 2514 also includes an estimating component 2504 for performing the operations illustrated at 1704 in FIG. 17. Additionally, the processing system 2514 includes an applying component 2506 for performing the operations illustrated at 1706 in FIG. 17.

The estimating component 2502, estimating component 2504, and applying component 2506 may be coupled to the processor 2508 via bus 2524. In certain aspects, estimating component 2502, estimating component 2504, and applying component 2506 may be hardware circuits. In certain aspects, the estimating component 2502, estimating component 2504, and applying component 2506 may be software components that are executed and run on processor 2508.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 14A:
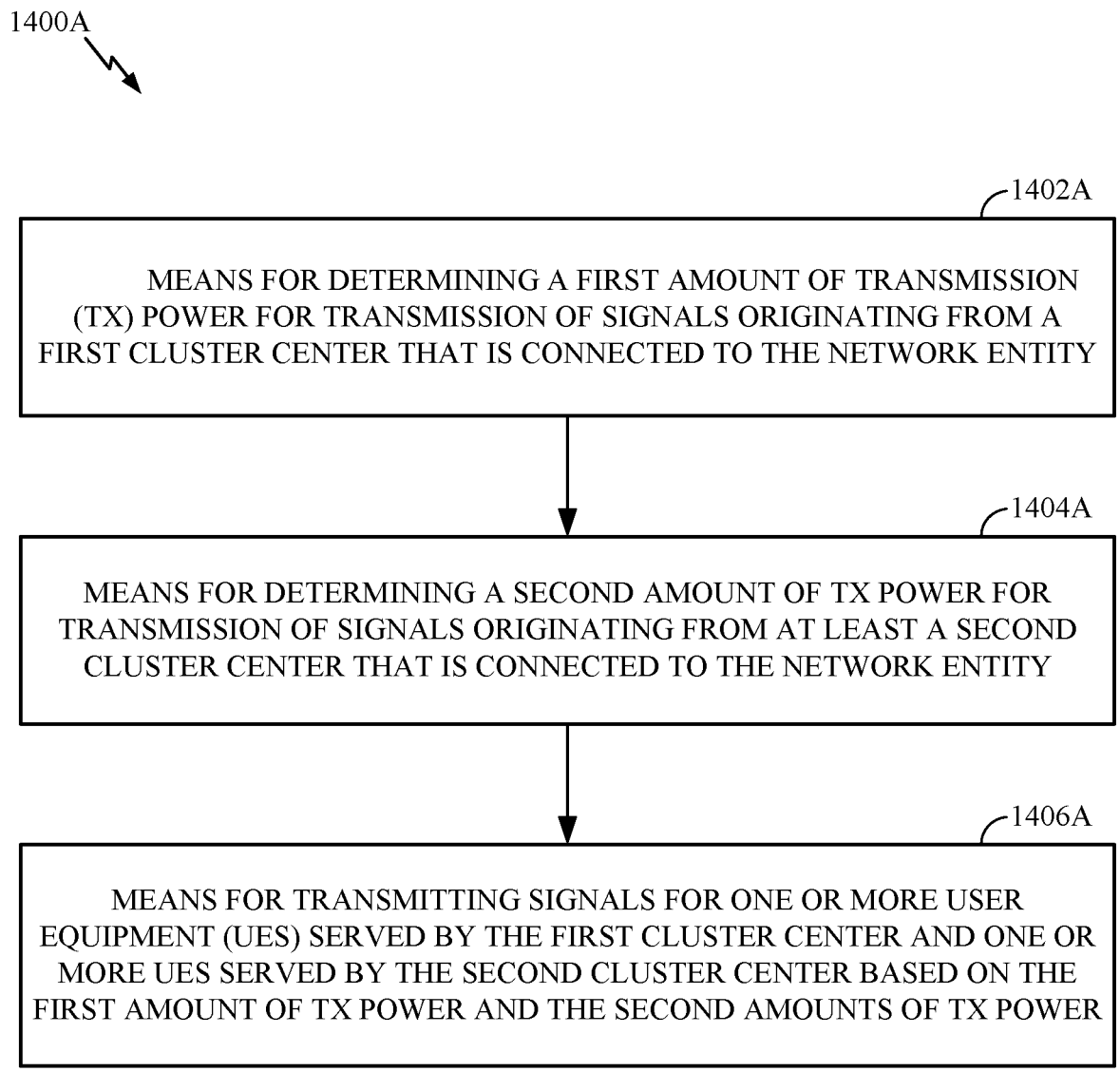
FIG. 14A illustrates example components capable of performing the operations shown in FIG. 14.
Figure 15A:
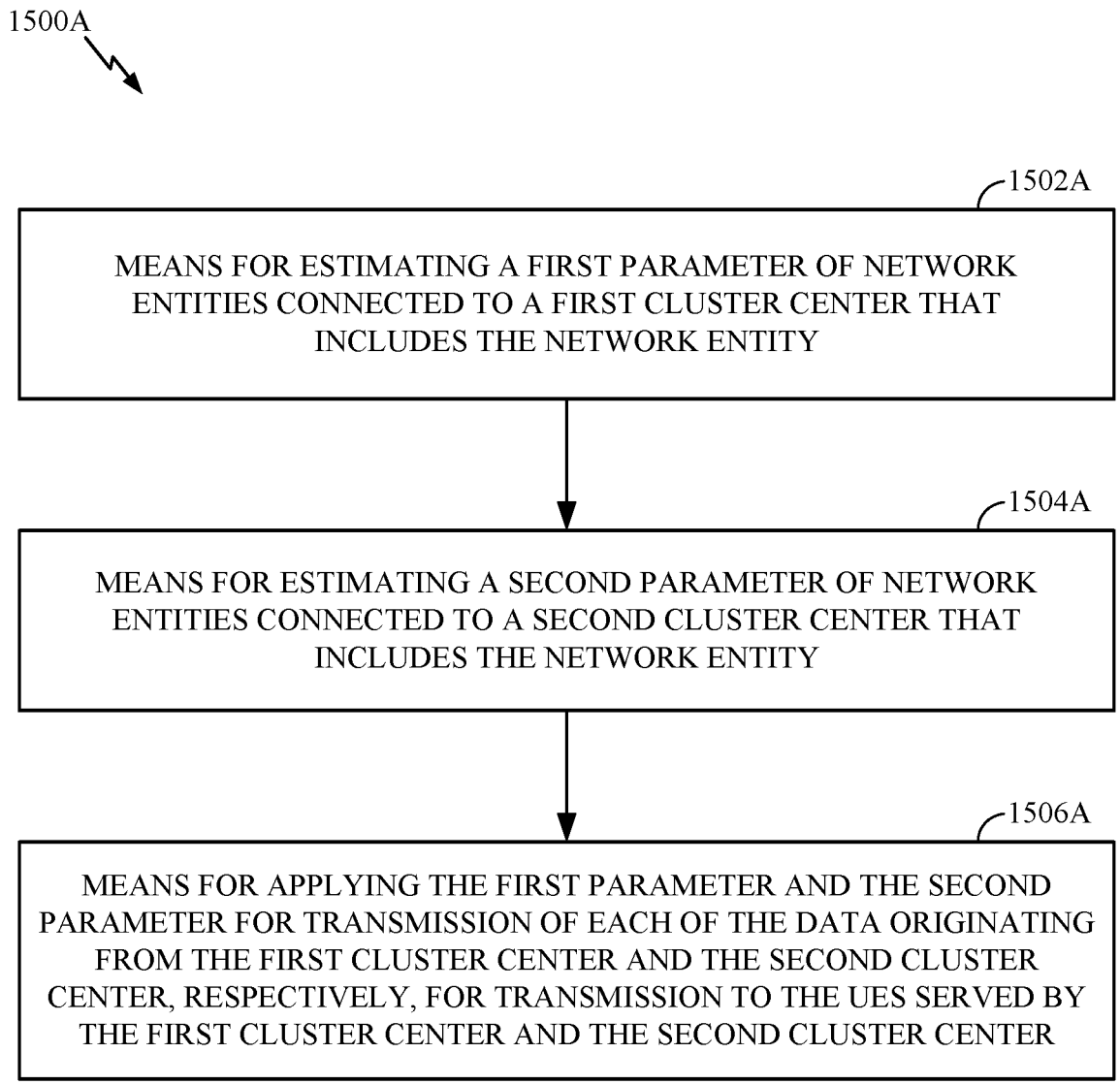
FIG. 15A illustrates example components capable of performing the operations shown in FIG. 15.
Figure 16A:
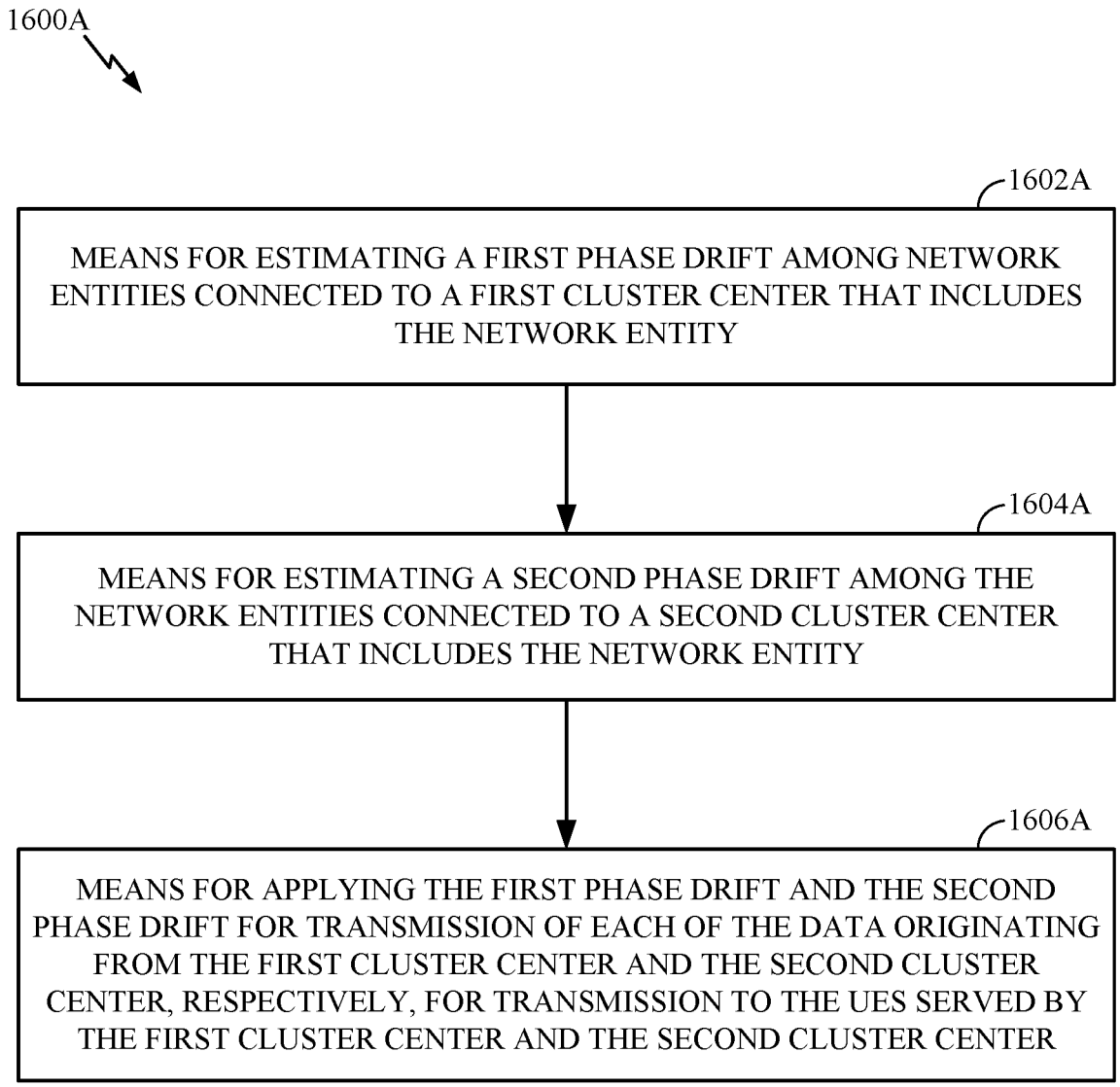
FIG. 16A illustrates example components capable of performing the operations shown in FIG. 16.
Figure 17A:
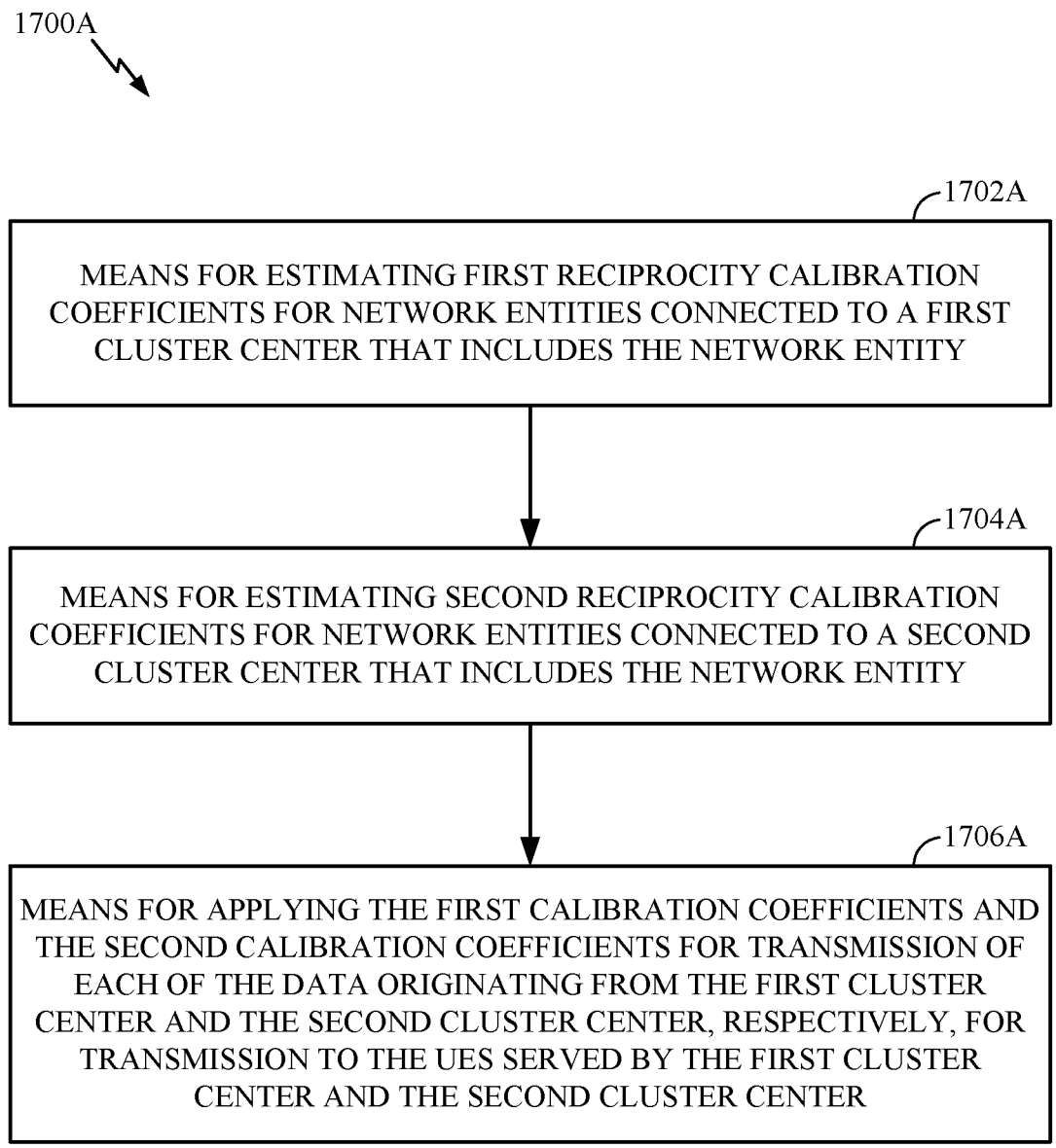
FIG. 17A illustrates example components capable of performing the operations shown in FIG. 17.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1400 illustrated in FIG. 14, operations 1500 illustrated in FIG. 15, operations 1600 illustrated in FIG. 16, and operations 1700 illustrated in FIG. 17 corresponds to means 1400A illustrated in FIG. 14A, means 1500A illustrated in FIG. 15A, means 1600A illustrated in FIG. 16A, and means 1700A illustrated in FIG. 17A respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for generating, means for communicating, means for computing, means for estimating, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS) comprising:
    determining a first amount of transmission (Tx) power for transmission of signals originating from a first cluster center that is connected to the BS;
    determining a second amount of Tx power for transmission of signals originating from at least a second cluster center that is connected to the BS; and
    transmitting signals for one or more user equipment (UEs) served by the first cluster center and one or more UEs served by the second cluster center based on the first amount of Tx power and the second amount of Tx power.

2. The method of claim 1, further comprising:
    generating power allocation information that includes at least the first amount of Tx power and the second amount of Tx power; and
    communicating the power allocation information to both the first cluster center and the second cluster center.

3. The method of claim 2, further comprising:
    receiving beam weights from at least one of the first cluster center or the second cluster center,
    wherein the at least one of the first cluster center or the second cluster center:
    receive the power allocation information from one or more network entities connected to at least one of the first cluster center or the second cluster center; and
    compute the beam weights, for the one or more network entities for serving one or more UEs served by at least one of the first cluster center or the second cluster center, based on constraints provided by the power allocation information.

4. The method of claim 1, wherein:
    the first cluster center is a serving cluster, and
    the second cluster center is a non-serving cluster.

5. The method of claim 1, wherein:
    the first amount of Tx power is configured for transmitting data originating from the first cluster center to the one or more UEs served by the first cluster center, and
    the second amount of Tx power is configured for transmitting data originating from the second cluster center to the one or more UEs served by the second cluster center.

6. A method for wireless communication by a base station (BS) comprising:
    estimating a first parameter of network entities connected to a first cluster center that includes the BS;
    estimating a second parameter of the network entities connected to a second cluster center that includes the BS; and
    applying the first parameter and the second parameter for transmission of data originating from the first cluster center and the second cluster center, respectively, for transmission to one or more UEs served by the first cluster center and the second cluster center.

7. The method of claim 6 wherein:
    the first parameter is a first phase drift among the network entities connected to the first cluster center that includes the BS, and
    the second parameter is a second phase drift among the network entities connected to the second cluster center that includes the BS.

8. The method of claim 7, wherein applying the first parameter and the second parameter comprises:
    applying the first phase drift and the second phase drift for transmission of the data originating from the first cluster center and the second cluster center, respectively, for transmission to one or more UEs served by the first cluster center and the second cluster center.

9. The method of claim 7, wherein the first cluster center is a serving cluster and the second cluster center is a non-serving cluster.

10. The method of claim 6, wherein:
the first parameter comprises first reciprocity calibration coefficients for the network entities connected to the first cluster center that includes the BS, and
the second parameter comprises second reciprocity calibration coefficients for the network entities connected to the second cluster center that includes the BS.

11. The method of claim 10, wherein applying the first parameter and the second parameter comprises:
applying the first reciprocity calibration coefficients and the second reciprocity calibration coefficients for transmission of the data originating from the first cluster center and the second cluster center, respectively, for transmission to one or more UEs served by the first cluster center and the second cluster center.

12. The method of claim 10, wherein the first cluster center is a serving cluster and the second cluster center is a non-serving cluster.

13. An apparatus for wireless communications by a base station (BS) comprising:
at least one processor configured to:
determine a first amount of transmission (Tx) power for transmission of signals originating from a first cluster center that is connected to the BS;
determine a second amount of Tx power for transmission of signals originating from at least a second cluster center that is connected to the BS; and
a transmitter configured to:
transmit signals for one or more user equipment (UEs) served by the first cluster center and one or more UEs served by the second cluster center based on the first amount of Tx power and the second amount of Tx power.

14. The apparatus of claim 13, wherein:
the at least one processor is further configured to generate power allocation information that includes at least the first amount of Tx power and the second amount of Tx power, and
the transmitter is further configured to communicate the power allocation information to both the first cluster center and the second cluster center.

15. The apparatus of claim 14, further comprising:
a receiver configured to:
receive beam weights from at least one of the first cluster center or the second cluster center,
wherein the at least one of the first cluster center or the second cluster center:
receive the power allocation information from one or more network entities connected to at least one of the first cluster center or the second cluster center; and
compute the beam weights, for the one or more network entities for serving one or more UEs served by at least one of the first cluster center or the second cluster center, based on constraints provided by the power allocation information.

16. The apparatus of claim 13, wherein:
the first cluster center is a serving cluster, and
the second cluster center is a non-serving cluster.

17. The apparatus of claim 13, wherein:
the first amount of Tx power is configured for transmitting data originating from the first cluster center to the one or more UEs served by the first cluster center, and
the second amount of Tx power is configured for transmitting data originating from the second cluster center to the one or more UEs served by the second cluster center.

18. An apparatus for wireless communication by a base station (BS) comprising:
at least one processor configured to:
estimate a first parameter of network entities connected to a first cluster center that includes the BS;
estimate a second parameter of the network entities connected to a second cluster center that includes the BS; and
apply the first parameter and the second parameter for transmission of data originating from the first cluster center and the second cluster center, respectively, for transmission to one or more UEs served by the first cluster center and the second cluster center; and
a memory coupled to the at least one processor.

19. The apparatus of claim 18 wherein:
the first parameter is a first phase drift among the network entities connected to the first cluster center that includes the BS, and
the second parameter is a second phase drift among the network entities connected to the second cluster center that includes the BS.

20. The apparatus of claim 19, wherein:
the at least one processor configured to apply the first parameter and the second parameter is further configured to:
apply the first phase drift and the second phase drift for transmission of the data originating from the first cluster center and the second cluster center, respectively, for transmission to one or more UEs served by the first cluster center and the second cluster center.

21. The apparatus of claim 19, wherein the first cluster center is a serving cluster and the second cluster center is a non-serving cluster.

22. The apparatus of claim 18, wherein:
the first parameter comprises first reciprocity calibration coefficients for the network entities connected to the first cluster center that includes the BS, and
the second parameter comprises second reciprocity calibration coefficients for the network entities connected to the second cluster center that includes the BS.

23. The apparatus of claim 22, wherein:
the at least one processor configured to apply the first parameter and the second parameter is further configured to:
apply the first reciprocity calibration coefficients and the second reciprocity calibration coefficients for transmission of the data originating from the first cluster center and the second cluster center, respectively, for transmission to one or more UEs served by the first cluster center and the second cluster center.

24. The apparatus of claim 22, wherein the first cluster center is a serving cluster and the second cluster center is a non-serving cluster.

* * * * *